United States Patent
Choi et al.

(10) Patent No.: US 10,988,406 B2
(45) Date of Patent: Apr. 27, 2021

(54) FLUOROPHOSPHATE GLASSES FOR ACTIVE DEVICE

(71) Applicant: KOREA PHOTONICS TECHNOLOGY INSTITUTE, Gwangju (KR)

(72) Inventors: Ju Hyeon Choi, Gwangju (KR); Jung Whan In, Daejeon (KR); June Park, Seoul (KR); Eui Sam Lee, Incheon (KR)

(73) Assignee: KOREA PHOTONICS TECHNOLOGY INSTITUTE, Gwangju (KR)

( * ) Notice: Subject to any disclaimer, the term of this patent is extended or adjusted under 35 U.S.C. 154(b) by 0 days.

(21) Appl. No.: 16/465,424

(22) PCT Filed: May 21, 2018

(86) PCT No.: PCT/KR2018/005804
§ 371 (c)(1),
(2) Date: May 30, 2019

(87) PCT Pub. No.: WO2018/212638
PCT Pub. Date: Nov. 22, 2018

(65) Prior Publication Data
US 2020/0002217 A1    Jan. 2, 2020

(30) Foreign Application Priority Data
May 19, 2017    (KR) .......................... 10-2017-0061911

(51) Int. Cl.
*C03C 3/247*    (2006.01)
*C03C 13/04*    (2006.01)

(52) U.S. Cl.
CPC ............ *C03C 3/247* (2013.01); *C03C 13/042* (2013.01)

(58) Field of Classification Search
CPC .......... C03C 3/247; C03C 13/042; C03C 4/12
See application file for complete search history.

(56) References Cited

U.S. PATENT DOCUMENTS

| 3,954,484 A | 5/1976 | Broemer et al. |
| 4,990,468 A | 2/1991 | Komiya et al. |
| (Continued) | | |

FOREIGN PATENT DOCUMENTS

| CN | 103183472 A | 7/2013 |
| JP | 11-060267 A | 3/1999 |
| JP | 2014-091650 A | 5/2014 |

OTHER PUBLICATIONS

International Search Report from corresponding PCT Application No. PCT/KR2018/005804, dated Jan. 2, 2019.

*Primary Examiner* — Noah S Wiese
(74) *Attorney, Agent, or Firm* — Harness, Dickey & Pierce, P.L.C.

(57) ABSTRACT

Disclosed is fluorophosphate glasses for an active device, the fluorophosphate glasses including: a metaphosphate composition including $Mg(PO_3)_2$ of about 20 mol % to about 60 mol %; a fluoride composition including $BaF_2$ of about 20 mol % to about 60 mol % and $CaF_2$ of about 0 mol % to about 40 mol %; and dopants including rare earth elements, in which there is an effect of increasing a carrier lifetime at a metastable state energy level that is stimulated-emitted due to an efficient energy transfer phenomenon by composition optimization of dopants (e.g. Er and Yb).

10 Claims, 35 Drawing Sheets

(56) References Cited

U.S. PATENT DOCUMENTS

| | | | | |
|---|---|---|---|---|
| 7,838,450 B2* | 11/2010 | Suzuki | ............ | C03C 3/247 |
| | | | | 501/44 |
| 2015/0299029 A1* | 10/2015 | Tachiwana | ............ | C03C 23/008 |
| | | | | 501/44 |
| 2015/0299030 A1* | 10/2015 | Tezuka | ............ | C03C 3/247 |
| | | | | 501/44 |

* cited by examiner

FLUOROPHOSPHATE GLASSES FOR ACTIVE DEVICE

CROSS-REFERENCE TO RELATED APPLICATIONS

This application is a national phase application of PCT Application No. PCT/KR2018/005804, filed on 21 May 2018, which claims the benefit and priority to Korean Patent Application No. 10-2017-0061911, filed on 19 May 2017. The entire disclosures of the applications identified in this paragraph are incorporated herein by references.

FIELD

The present disclosure relates to fluorophosphate glasses for an active device and, more particularly, to the composition of fluorophosphate glasses for an active device, the fluorophosphate glasses having thermal and mechanical properties to be able to be used as a glass base material for an optical fiber laser and being composed of $Mg(PO_3)_2$ and fluorides ($MF_2$, M=Ba, Ca, Sr).

BACKGROUND

In general, an erbium-doped fiber amplifier (EDFA), which is an optical fiber amplifier device that is used as an important device in not only a wavelength division multiplexing (WDM) communication system, but most optical networks, amplifies light having a wavelength between 1530 and 1610 nm by doping an optical fiber made of glass with erbium.

Fluorophosphate (FP) glass produced by mixing fluoride glass with phosphate has excellent thermal stability and chemical durability, low phonon energy, and excellent linearity of a light transmittance characteristic and a refractive index in a wide spectrum region from the ultraviolet ray to the near infrared ray, as compared with fluoride glass. Further, when a rare earth (RE) element is used as a dopant, high dopant concentration can be achieved by providing multiple energy levels, so the fluorophosphate glass is a glass base material that can achieve high efficiency even using a short cavity.

Meanwhile, ytterbium (Yb) provides a considerably high absorption cross-section in the region of 980 nm, and is used as a sensitizer of laser excitation by being co-doped with erbium (Er) because overlap of the energy level of a donor ($^2F_{5/2}$, $Yb^{3+}$) and the energy level of an acceptor ($^4I_{11/2}$, $Er^{3+}$).

The application range of the fluorophosphate glass co-doped with Er/Yb having these excellent characteristics, in order to use the excellent characteristics described above, has been increased recently up to not only existing applications such as a visible light or infrared laser, an optical fiber amplifier, an optical storage device, and a submarine optical communication network, but a 3D space observation system that requires high output such as LiDAR (Light Detection and Ranging).

However, in order to be used in this wide application field, it is required to develop a fluorophosphate glass base material that can achieve high pulse output even if the size of a device is reduced.

To this end, it is required to increase an emission cross-section characteristic or improve emission long-lifetime characteristic of carriers

SUMMARY

Technical Problem

An object of the present disclosure is to provide fluorophosphate glasses for an active device, the fluorophosphate glasses having thermal and mechanical properties to be able to be used as a glass base material for an optical fiber laser and having an emission long-lifetime characteristic.

Technical Solution

In order to achieve the objects, fluorophosphate glasses for an active device according to an aspect of the present disclosure includes: a metaphosphate composition including $Mg(PO_3)_2$; a fluoride composition including about 20 mol % to about 60 mol % of $BaF_2$ and about 0 mol % to about 40 mol % of $CaF_2$; and a dopant composed of rare earth elements.

Further, the $Mg(PO_3)_2$ may be about 30 mol %.
Further, the $CaF_2$ may be about 20 mol %.
Further, the $BaF_2$ may be about 40 mol % to about 60 mol % and the $CaF_2$ may be about 10 mol % to about 30 mol %.
Further, the $Mg(PO_3)_2$ may be about 30 mol % to about 50 mol % and the $BaF_2$ may be about 30 mol % to about 50 mol %.
Further, the dopants may be $ErF_3$ and $YbF_3$, the $ErF_3$ may be about 3 mol %, and the $YbF_3$ may be about 3 mol % to about 6 mol %.
Further, the $Mg(PO_3)_2$ may be about 30 mol %.
Further, the $CaF_2$ may be about 20 mol %.
Further, the $BaF_2$ may be about 40 mol % to about 60 mol % and the $CaF_2$ may be about 10 mol % to about 30 mol %.
Further, the $Mg(PO_3)_2$ may be about 30 mol % to about 50 mol % and the $BaF_2$ may be about 30 mol % to about 50 mol %.
Further, the $YbF_3$ may be about 4 mol %.
Further, the $Mg(PO_3)_2$ may be about 30 mol %.
Further, the $CaF_2$ may be about 20 mol %.
Further, the $BaF_2$ may be about 40 mol % to about 60 mol % and the $CaF_2$ may be about 10 mol % to about 30 mol %.
Further, the $Mg(PO_3)_2$ may be about 30 mol % to about 50 mol % and the $BaF_2$ may be about 30 mol % to about 50 mol %.

Advantageous Effects

According to the present disclosure, thermal properties including glass transition temperature (tg) and peak temperature (tp), thermomechanical properties including coefficient of thermal expansion (CTE), and mechanical properties including Knop hardness are improved, so there is provided an advantage in the process of manufacturing an active device including an optical fiber laser.

According to the present disclosure, there is an effect of being able to achieve high pulse output even if the size of a device is decreased by achieving an emission long-lifetime characteristic.

According to the present disclosure, there is an effect of increasing the lifetime of carriers at a metastable state energy level that is stimulated-emitted due to an effective energy transfer phenomenon by composition optimization of dopants (e.g., Er and Yb).

DETAILED DESCRIPTION

Hereafter, various embodiments of fluorophosphate glasses for an active device according to the present disclosure are described in detail with reference to the drawings.

Fluorophosphate glasses according to the present embodiment have $Mg(PO_3)_2$—$BaF_2$—(Sr, Ca, Mg)$F_2$ as a base material. In detail, the inventor(s) proposes the composition of fluorophosphate glasses composed of $ErF_3$—$YbF_3$—$Mg(PO_3)_2$—$BaF_2$—$CaF_2$ or has these compositions as a base material as characteristic of the present disclosure.

Accordingly, as for $Mg(PO_3)_2$—$BaF_2$—$CaF_2$-based glass, by satisfying thermal and mechanical property conditions that can be applied to glass for an active device (e.g., an optical fiber laser) and optimizing the composition ratio (mol %) of a dopant composed of $Er^{3+}$ and $Yb^{3+}$, an emission long-lifetime characteristic is achieved such that an effect that can achieve high pulse output even if the size of devices is reduced can be derived.

Figure 1A:
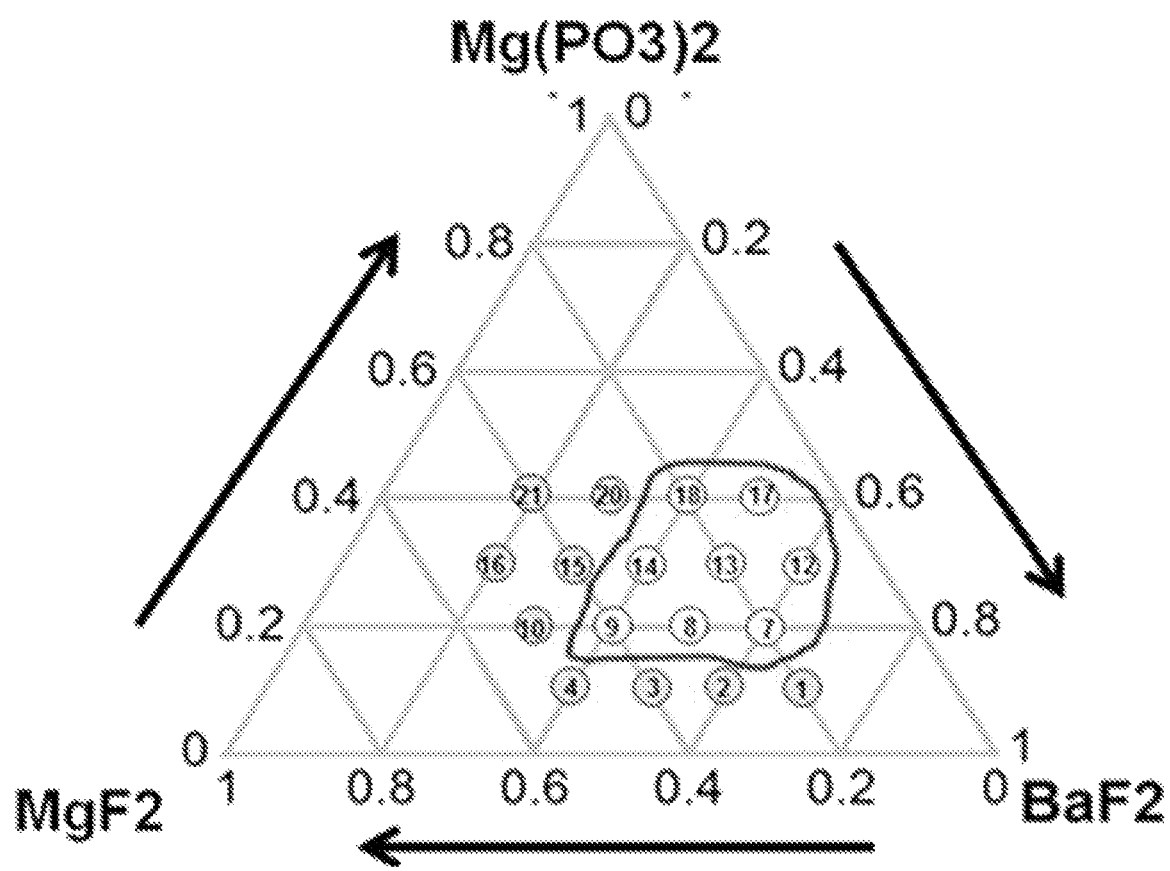
FIGS. 1A, 1B, and 1C are diagrams of glass composition design of $Mg(PO_3)_2$—$BaF_2$—$(Sr, Ca, Mg)F_2$.
Figure 1B:
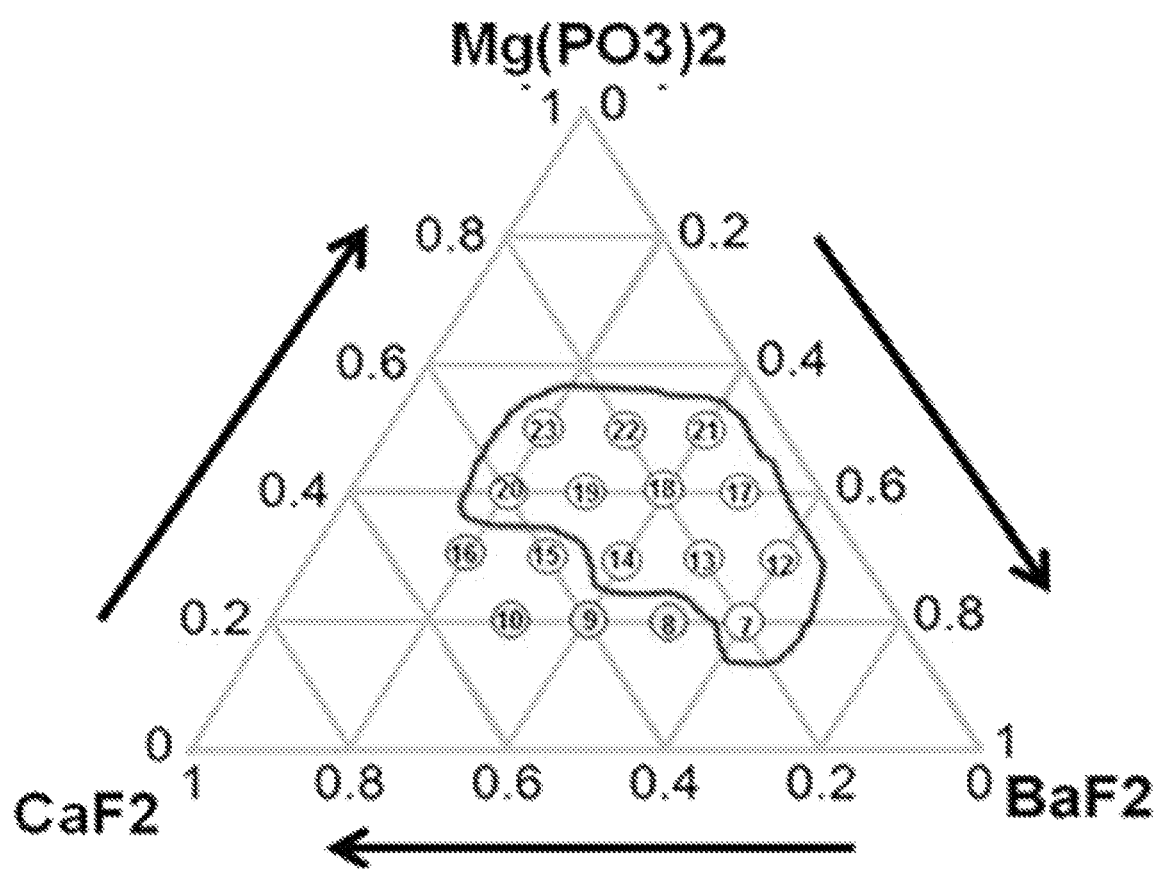
Figure 1C:
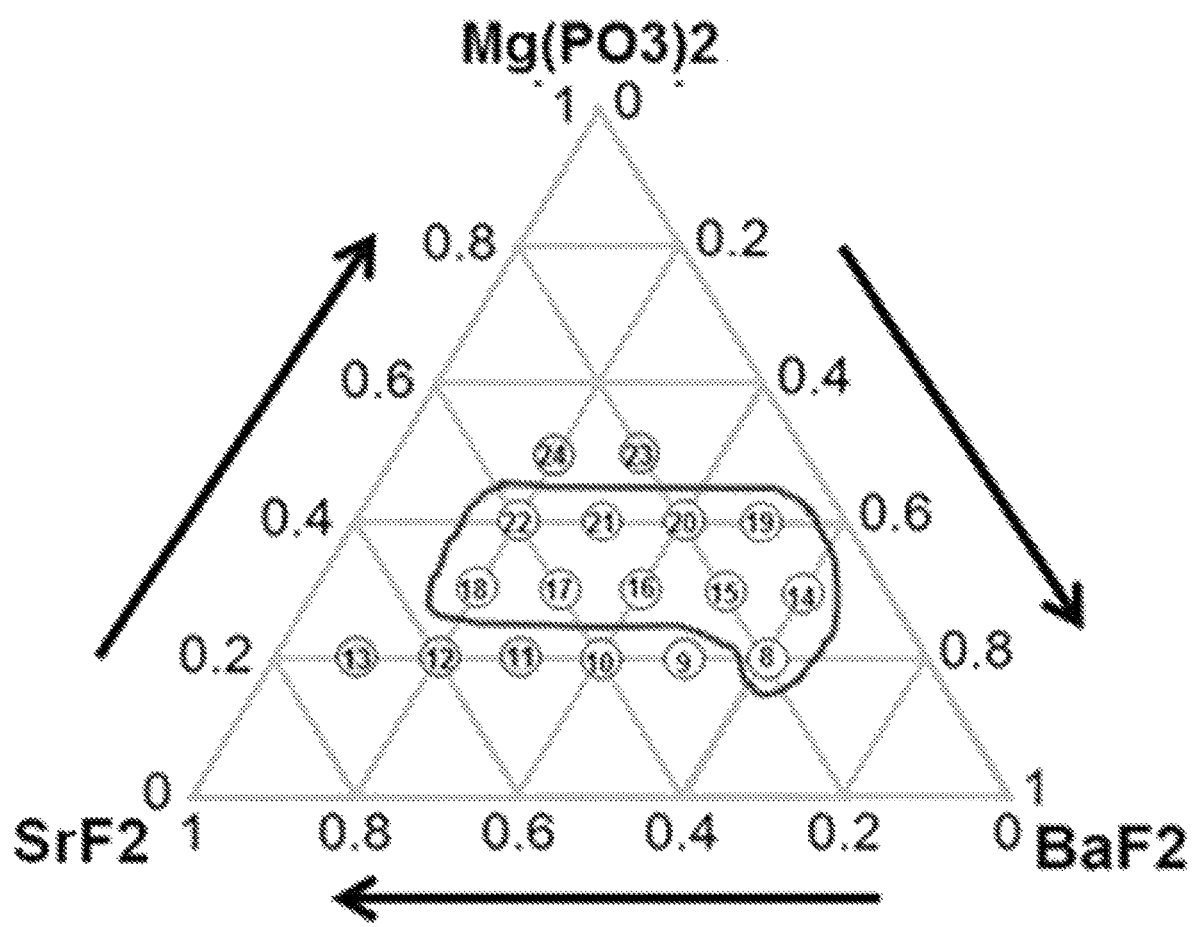

FIGS. 1A, 1B, and 1C are diagrams of glass composition design of $Mg(PO_3)_2$—$BaF_2$—(Sr, Ca, Mg)$F_2$.

Referring to FIGS. 1A, 1B, and 1C, it can be seen that a sample composition determined on the basis of a glass forming region in a material combination of fluorophosphate glasses that uses $Mg(PO_3)_2$ as phosphate, a network former, and is used as each of a fluorine compound of strontium (Sr), calcium (Ca), and magnesium (Mg).

In FIGS. 1A, 1B, and 1C, it is the sample composition positioned in a black boundary (closed curve) and suitability as a glass base material for an active device was checked by analyzing thermal and mechanical property changes according to a change of the composition ratio (mol %) of each composition. This is described with reference to FIGS. 2A, 2B, and 2C and FIGS. 3A, 3B, and 3C.

Figure 2A:
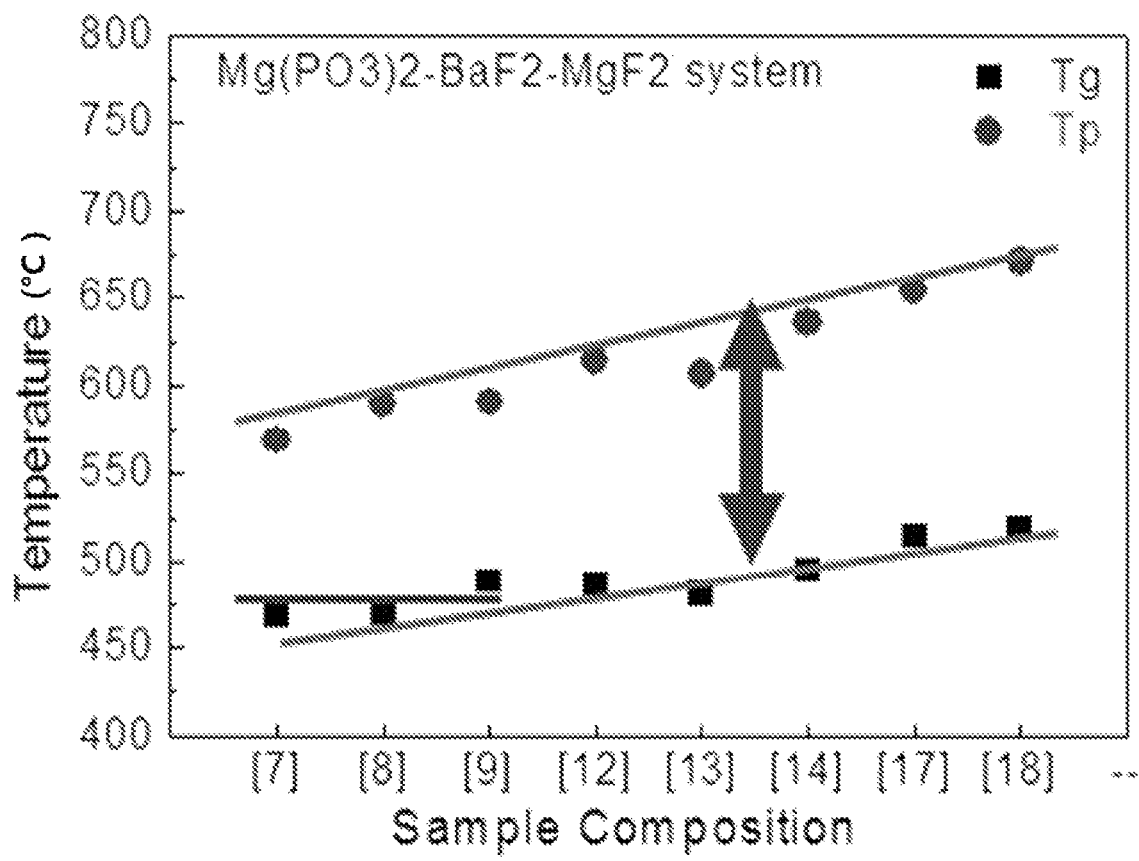
FIGS. 2A, 2B, and 2C are diagrams showing test results of thermal property estimation of $Mg(PO_3)_2$—$BaF_2$—(Sr, Ca, Mg)$F_2$.
Figure 2B:
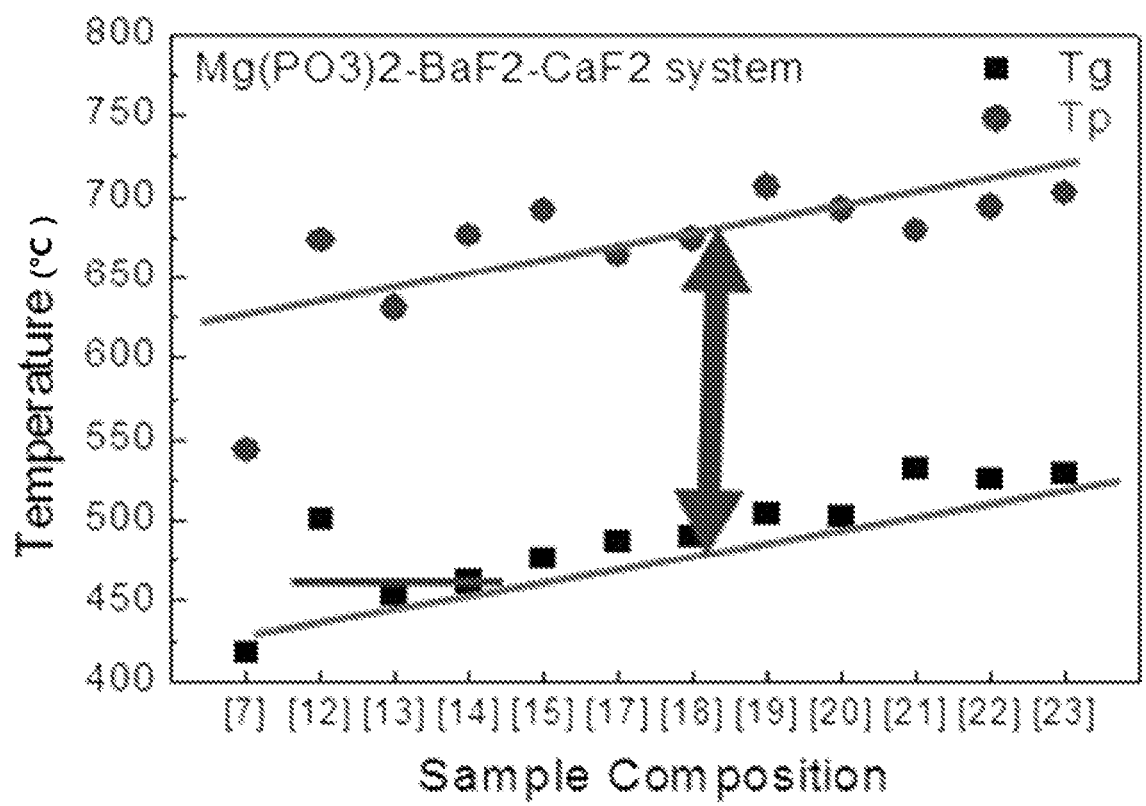
Figure 2C:
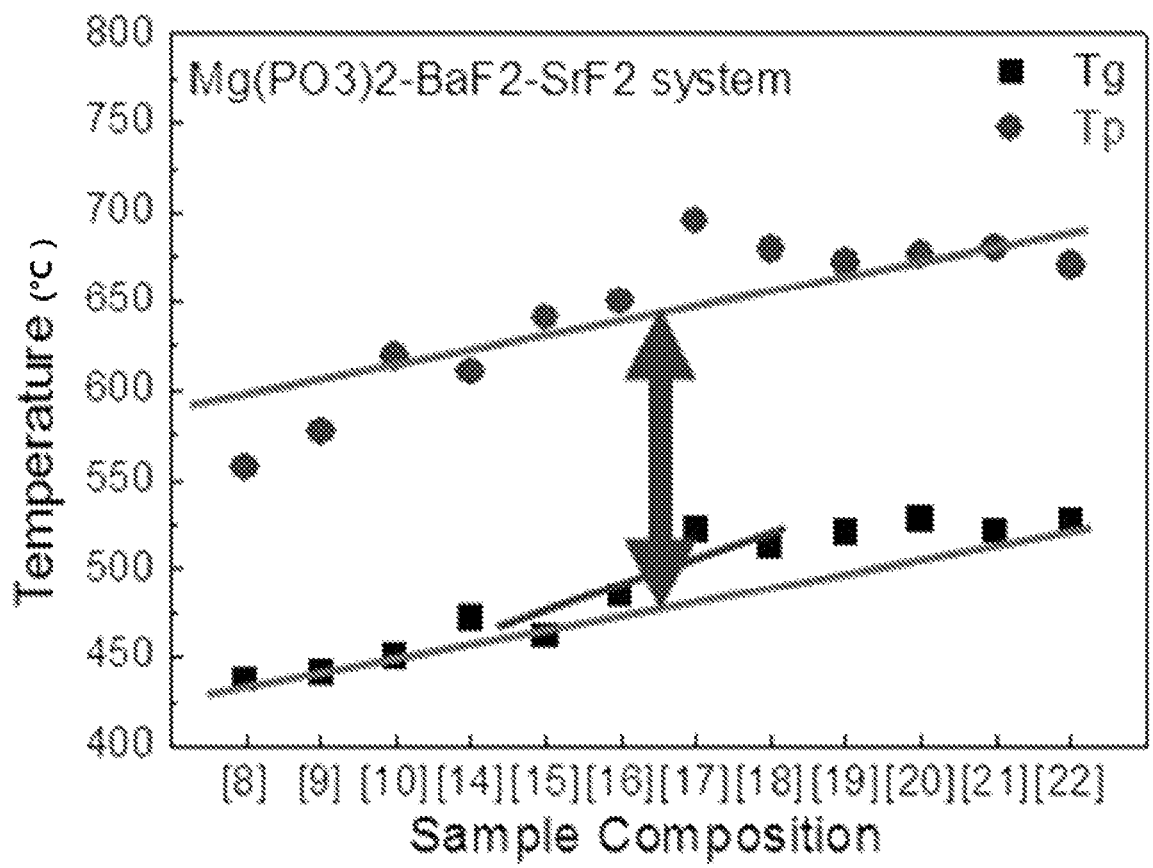

FIGS. 2A, 2B, and 2C are diagrams showing test results of thermal property estimation of $Mg(PO_3)_2$—$BaF_2$—(Sr, Ca, Mg)$F_2$-based glass and FIG. 3 is a diagram showing a test result of thermal property estimation according to the composition of $Mg(PO_3)_2$—$BaF_2$—$CaF_2$-based glass (MBC system) and an ion concentration change of erbium (Er).

An optical fiber is manufactured by reheating and drawing a glass base material manufactured in an ingot shape at a predetermined temperature and at a predetermined speed.

Accordingly, glass transition temperature Tg and peak temperature Tp are the first factors that determine difficulty and yield of a process of glass base materials for manufacturing optical fibers.

Referring to FIGS. 2A, 2B, and 2C, it can be seen that as the content of (Mg, Ca, Sr)$F_2$ to $BaF_2$ increases, the glass transition temperature Tg and the peak temperature Tp linearly increase with a low inclination. That is, the changes of the transition temperature Tg and the peak temperature Tp according to the content of (Mg, Ca, Sr)$F_2$ are determined as being slight.

Accordingly, in $Mg(PO_3)_2$—$BaF_2$—(Sr, Ca, Mg)$F_2$-based glass, a change in the composition has low influence on the difficulty and yield of a drawing process in manufacturing of an optical fiber, so there is the advantage that the composition optimization for adjusting other characteristics is possible Further, it can be seen that as the content of $Mg(PO_3)_2$ increases, that is, the content of a network former increases, the structure of rigidity relatively increases, so the glass transition temperature increases.

This means that there is a limit in a composition change range of the content of $Mg(PO_3)_2$.

Figure 3A:
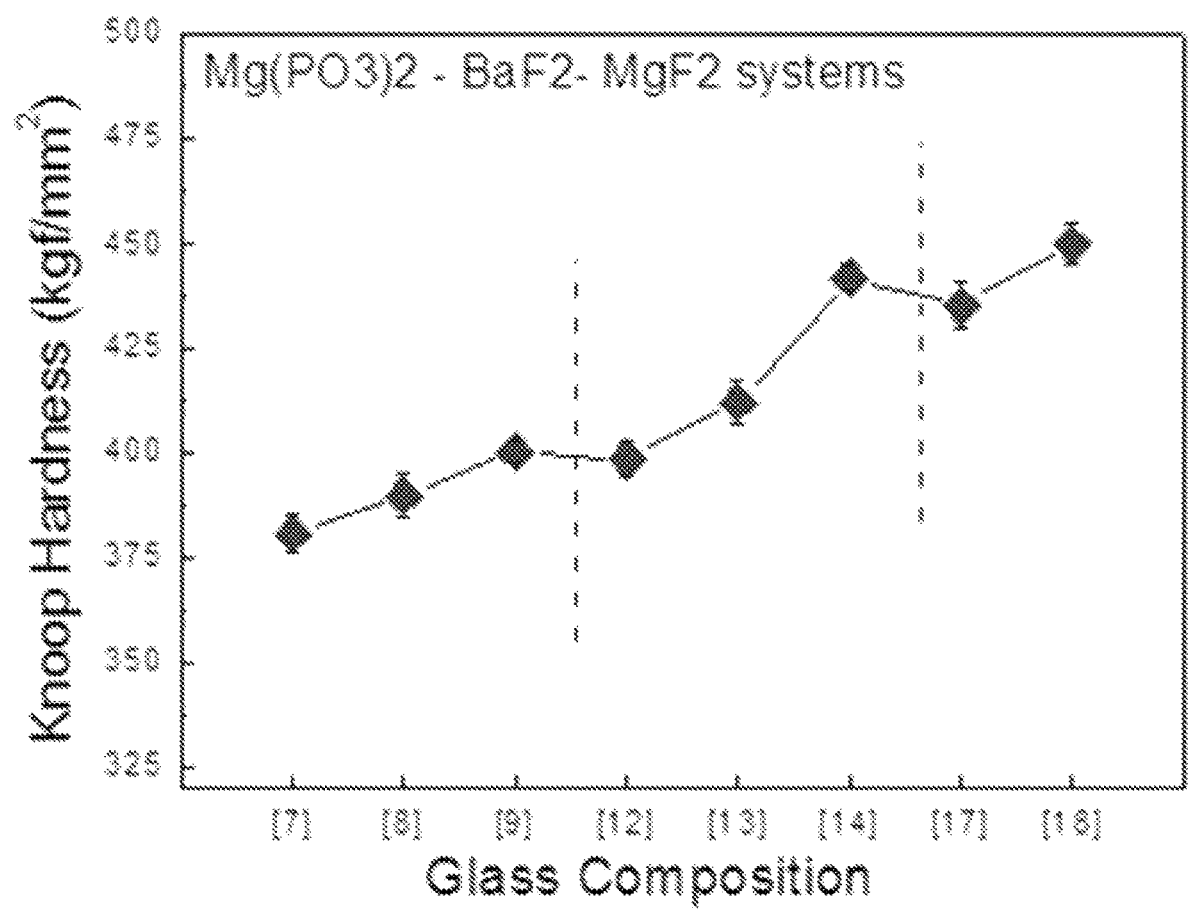
FIGS. 3A, 3B, and 3C are diagrams showing test results of mechanical property estimation according to glass composition design of $Mg(PO_3)_2$—$BaF_2$—(Sr, Ca, Mg)$F_2$.
Figure 3B:
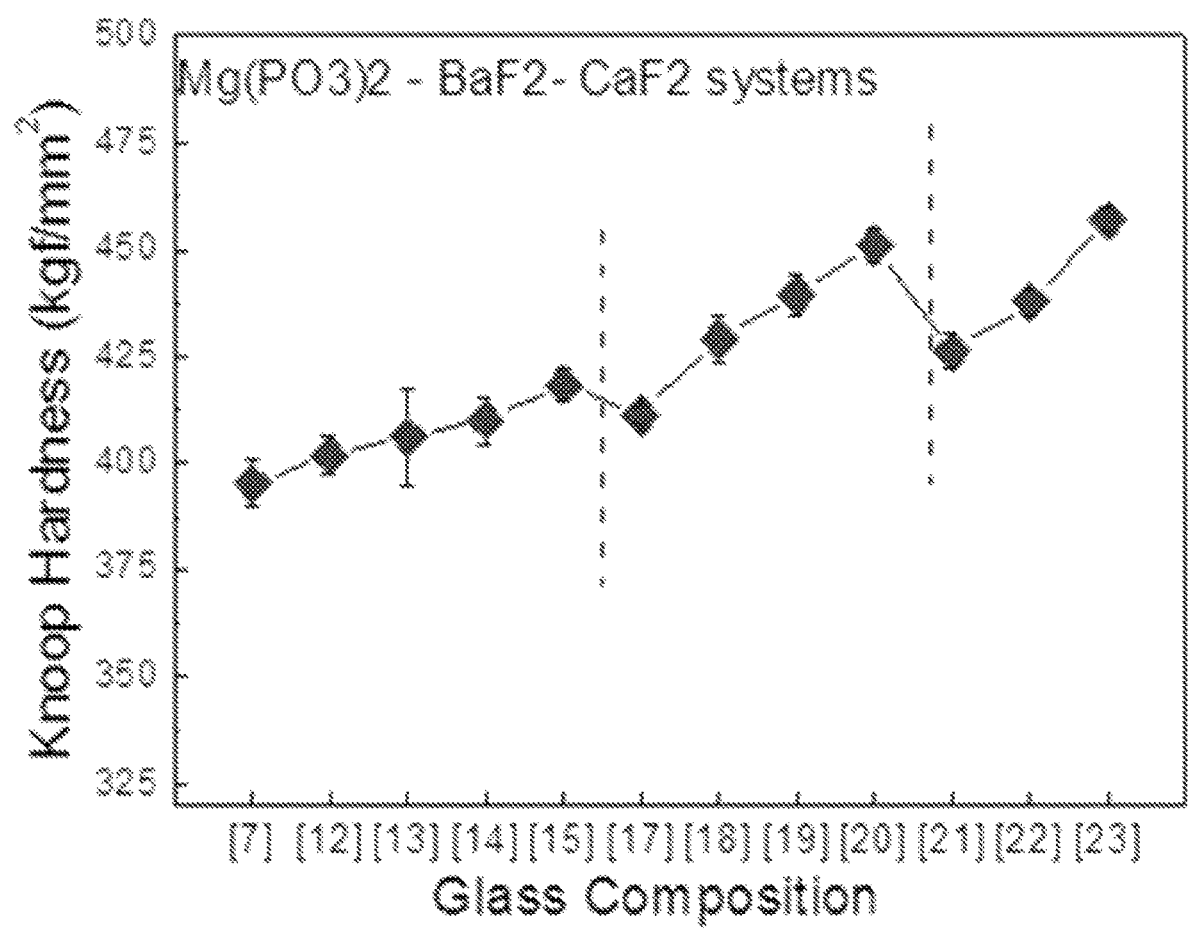
Figure 3C:
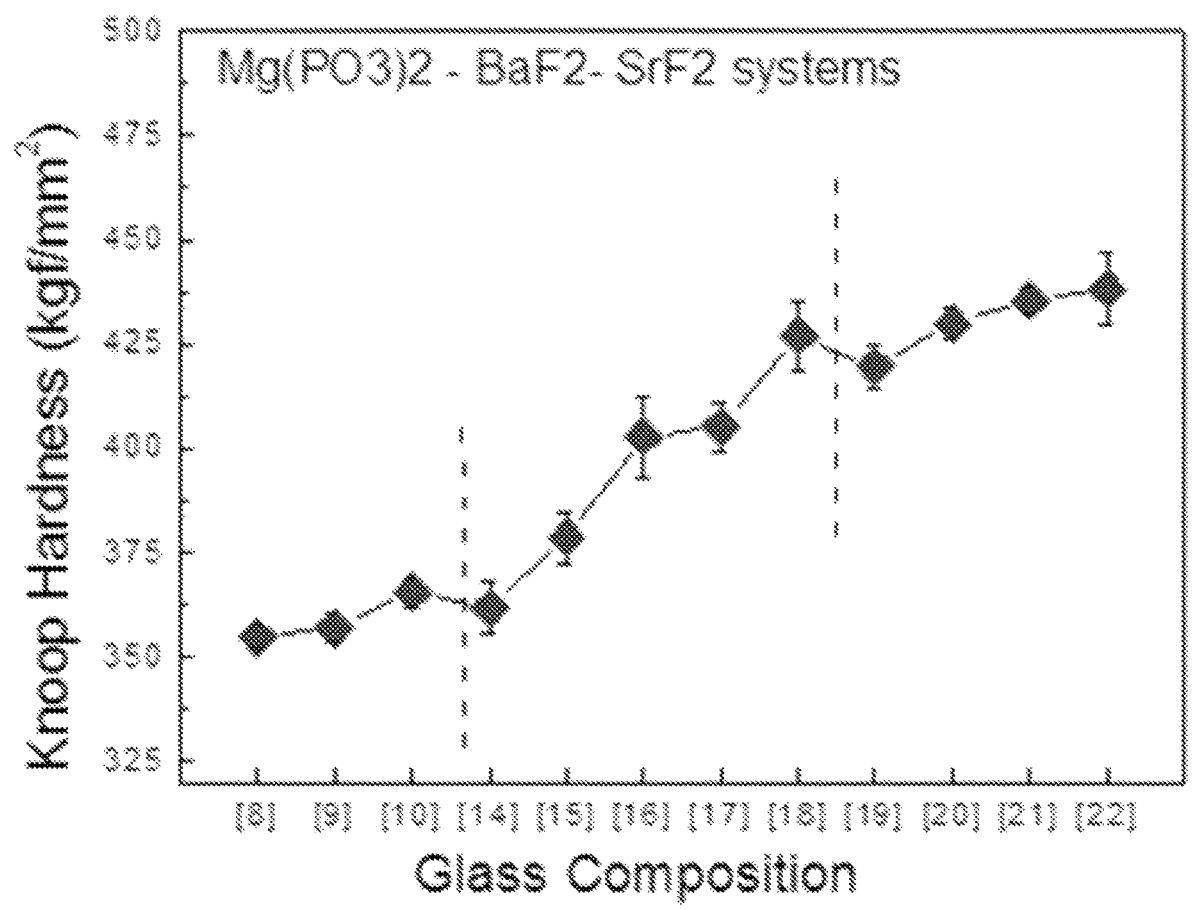

FIGS. 3A, 3B, and 3C are diagrams showing test results of glass mechanical property estimation according to glass composition design of $Mg(PO_3)_2$—$BaF_2$—(Sr, Ca, Mg)$F_2$.

Referring to FIGS. 3A, 3B, and 3C, as the content of $MgF_2$ increases instead of $BaF_2$ in an $Mg(PO_3)_2$—$BaF_2$—(Sr, Ca, Mg)$F_2$-based glass composition candidate group, Knoop hardness linearly increases, and in terms of a mechanical hardness characteristic according to the content of $Mg(PO_3)_2$, can be divided into three parts of sample composition regions (7), (8), and (9) including $Mg(PO_3)_2$ of 0.2 mol %, sample composition regions (12), (13), and (14) including $Mg(PO_3)_2$ of 0.3 mol %, and sample compositions (17) and (18) including $Mg(PO_3)_2$ of 0.4 mol %.

Further, the tendency of knoop hardness is shown in $Mg(PO_3)_3$—$BaF_2$—$CaF_2$-based and $Mg(PO_3)_3$—$BaF_2$—$SrF_2$-based glasses, which is determined as showing that as the content of $Mg(PO_3)_2$ that is a network former relatively increases from 20 mol % to 50 mol %, the structure of rigidity relatively increases and the knoop hardness also increases with the glass transition temperature.

Figure 4:
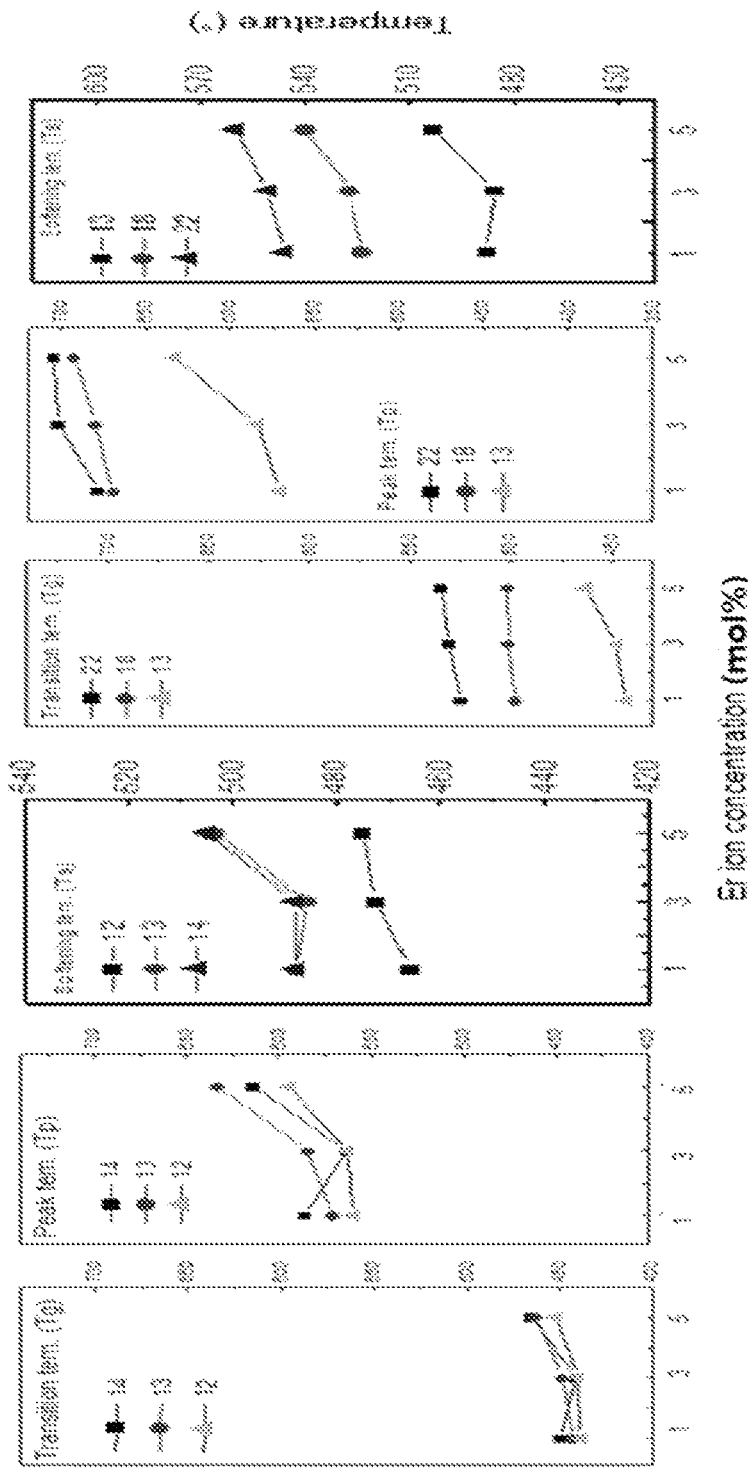
FIGS. 4 and 5 are diagrams showing test results of thermal property estimation according to a composition change of $Mg(PO_3)_2$—$BaF_2$—$CaF_2$ doped with $ErF_3$.
Figure 5:
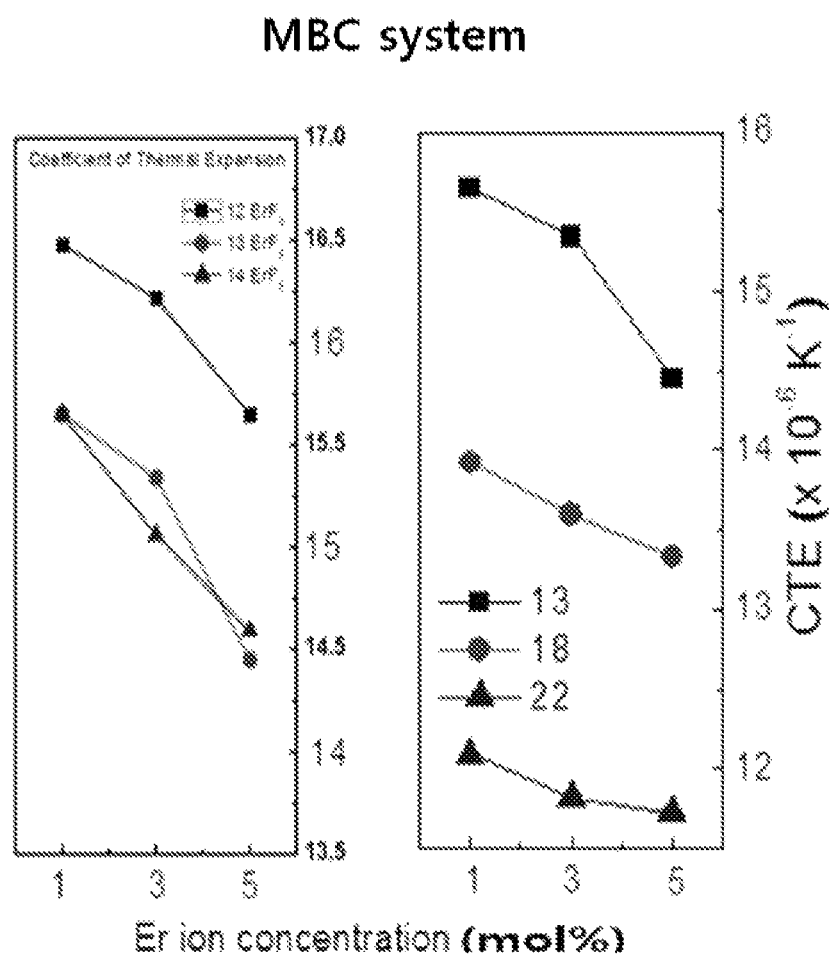

FIGS. 4 and 5 are diagrams showing test results of thermal property estimation according to a composition change of $Mg(PO_3)_2$—$BaF_2$—$CaF_2$ doped with $ErF_3$.

FIG. 4 is a diagram showing thermal property estimation (Tg, Tp, and Ts) and FIG. 5 is a diagram showing a coefficient of thermal expansion (CTE).

Referring to FIG. 4, it can be seen that characteristic changes of glass transmission temperature Tg and peak temperature Tp of sample compositions (12), (13), (14), (18), and (22) in $Mg(PO_3)_2$—$BaF_2$—$CaF_2$.

In detail, it can be seen that the changes of the glass transmission temperature Tg and peak temperature Tp of the sample compositions 12, 13, and 14 where the composition ratio of $Mg(PO_3)_2$ is maintained at predetermined level are slight.

However, it can be seen that the changes of the glass transmission temperature Tg and peak temperature Tp are very relatively large in the sample compositions 13, 18, and 22 where the content of $Mg(PO_3)_2$ changes.

It can be seen that this is the same as the tendency found in FIGS. 2A, 2B, and 2C.

Meanwhile, referring to FIG. 5 together, it can be seen that the changes of Tg, Ts, and CTE in the sample compositions (12), (13), and (14) where the mole ratio (mol %) content of $Mg(PO_3)_2$ is the same are relatively smaller than the variation in the sample composition (13), (18), and (22) where the mole ratio of $Mg(PO_3)_2$ increases.

Further, as the content of $ErF_3$ increases in all compositions, Tg and Ts increase and the coefficient of thermal expansion (CTE) decreases.

When an optical fiber expands or contracts in accordance with external temperature, the transmission characteristic of a communication system is obviously deteriorated and a change of a gain characteristic is caused in an optical fiber laser or an optical fiber amplifier, so it is preferable that a thermal expansion coefficient is small.

Referring to FIG. 5, it can be seen that the coefficient of thermal expansion (CTE) is large, but the distribution range is narrow when the mole ratio of $Mg(PO_3)_2$ is maintained at a predetermined level and the mole ratios of fluorides ($BaF_2$ and $CaF_2$) are complementarily adjusted as in the sample compositions (12), (13), and (14) in comparison to when the mole ratio of $Mg(PO_3)_2$ is changed as in the sample compositions (13), (18), and (22). Further, it can be seen that, in the sample compositions (13), (18), and (22), the coefficient of thermal expansion (CTE) is low, but the distribution range is wide, so the characteristic change may be large even by a small change in composition ratio.

Figure 6:
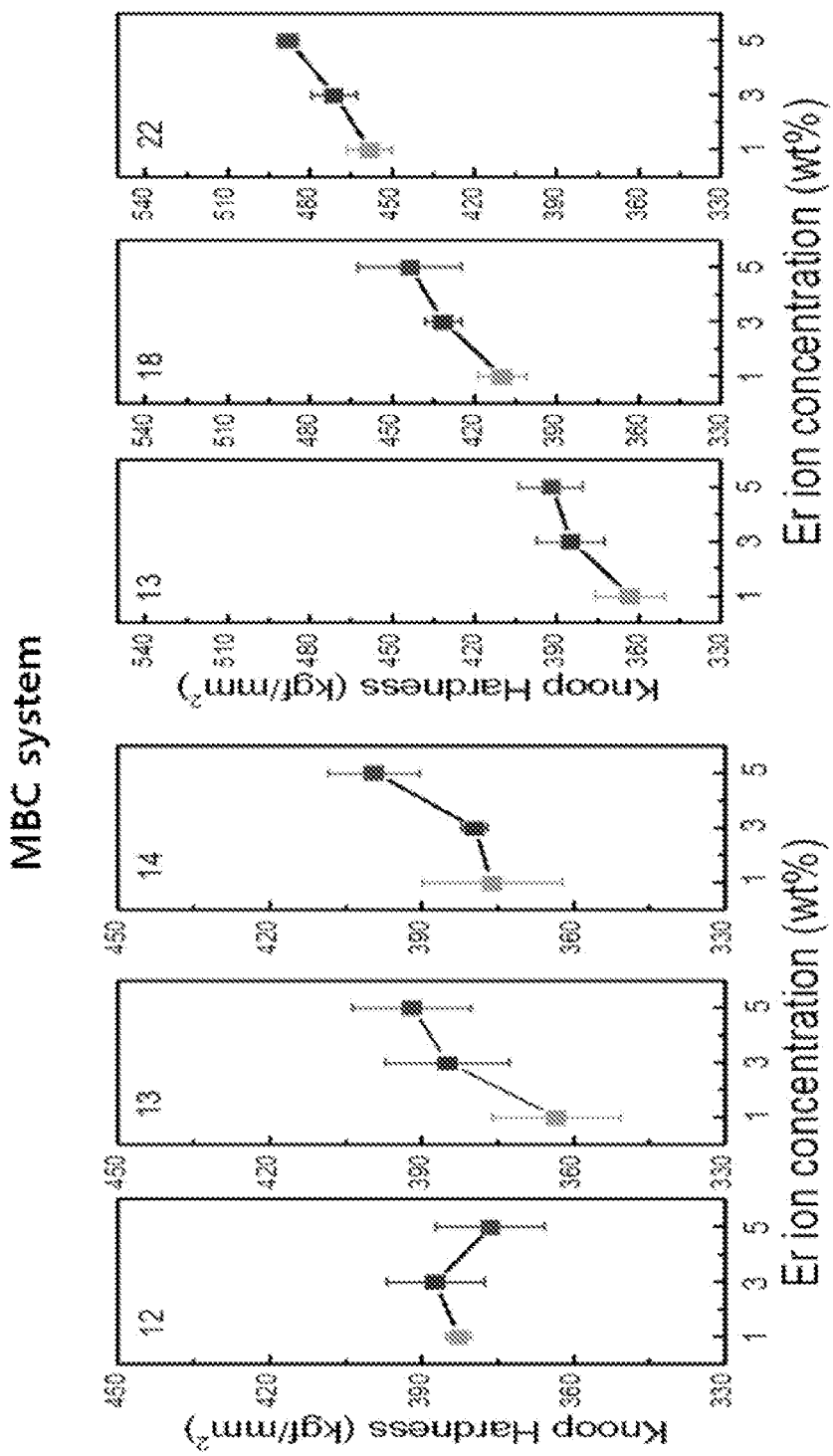
FIG. 6 is a diagram showing a test result of mechanical property estimation according to a composition change of $Mg(PO_3)_2$—$BaF_2$—$CaF_2$.

FIG. 6 is a diagram showing a test result of mechanical property estimation according to a composition change of $Mg(PO_3)_2$—$BaF_2$—$CaF_2$ doped with $ErF_3$.

Referring to FIG. 6, it can be seen that knoop hardness is dominantly influenced by the mole ratio of the doped $ErF_3$ more than by the mole ratio difference of fluorides ($BaF_2$ and $CaF_2$) when the mole ratio of $Mg(PO_3)_2$ is maintained at a predetermined level and the mole ratios of fluorides ($BaF_2$ and $CaF_2$) are complementarily adjusted as in the sample compositions (12), (13), and (14).

Meanwhile, it can be seen that as the mole ratio of $Mg(PO_3)_2$ increases, rigidity and knoop hardness increase when the mole ratio of $Mg(PO_3)_2$ increases, as in the sample compositions (13), (18), and (22).

Further, it can be seen that as the mole ratio of $ErF_3$ increases, the knoop hardness also increases, but the factor that dominantly influences this tendency is determined as a change in a mole ratio of $Mg(PO_3)_2$.

Figure 7:
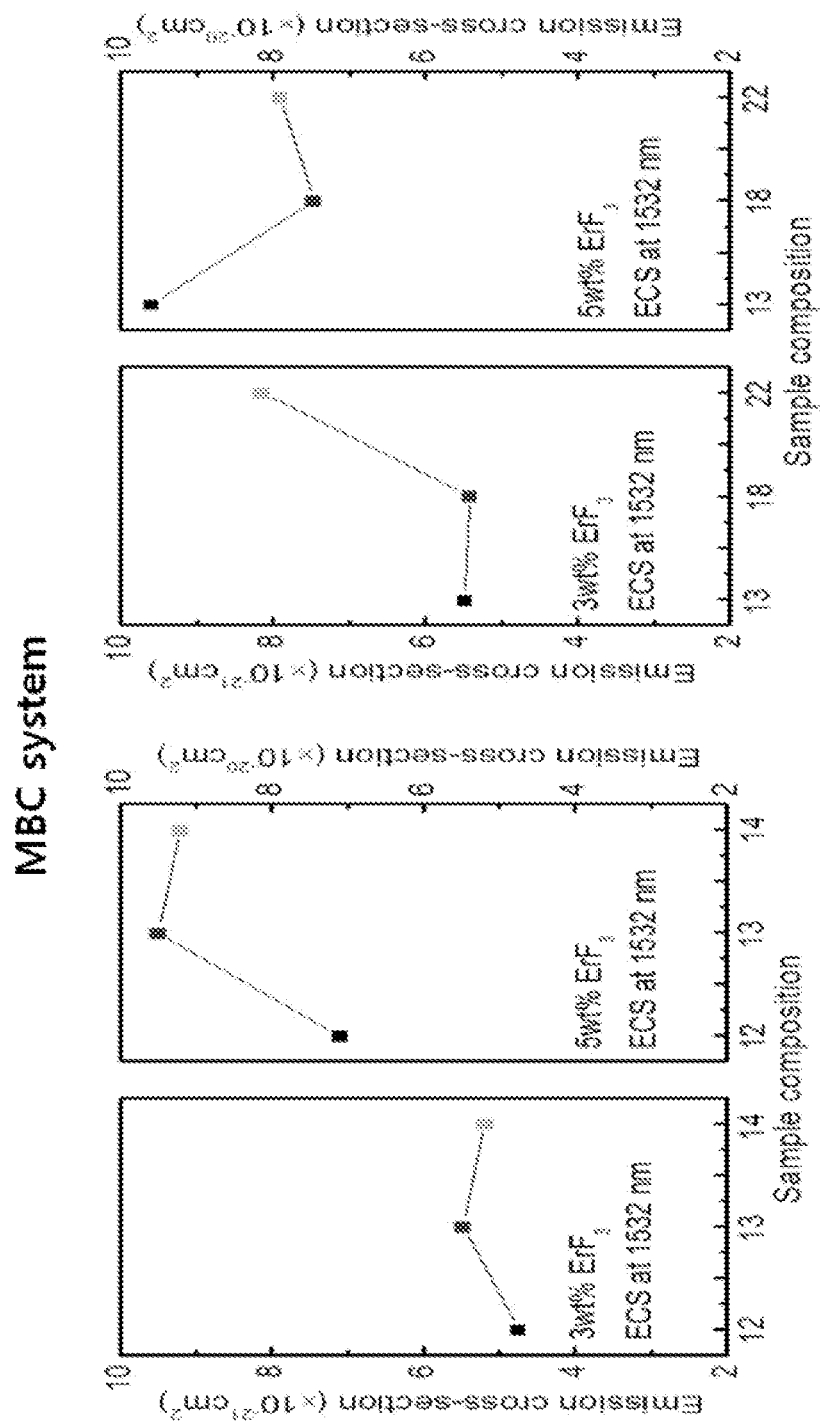
FIG. 7 is a diagram showing a test result of spectroscopic property estimation according to a composition change of $ErF_3$—$Mg(PO_3)_2$—$BaF_2$—$CaF_2$.

FIG. 7 is a diagram showing a test result of spectroscopic property estimation according to a composition change of $Mg(PO_3)_2$—$BaF_2$—$CaF_2$-based glasses doped with $ErF_3$.

Referring to FIG. 7, as the composition of $Mg(PO_3)_2$ is maintained at a predetermined level and the content of $CaF_2$ increases, the content of $BaF_2$ complementarily decreases in $ErF_3$—$Mg(PO_3)_2$—$BaF_2$—$CaF_2$-based glass composition of 5 mol %, that is, as the sample composition goes from the sample composition (12) to the sample composition (14), the emission cross-section increases.

Further, it can be seen that as the content of $Mg(PO_3)_2$ increases in $ErF_3$—$Mg(PO_3)_2$—$BaF_2$—$CaF_2$-based glass composition of 5 mol %, that is, as the sample composition goes from the sample composition (13) to the sample composition (22), the emission cross-section relatively decreases.

The tendency of the emission cross-section according to a composition is the same as the tendency of the absorption cross-section, so it is determined that the radiative transition energy is also relatively high in a composition receiving a relatively large amount of pumping energy.

It is possible to infer from the tendency of an emission cross-section of 1532 nm that the radiative transition efficiency is relatively high in the sample composition (13) of the composition candidates.

Further, it can be seen that the relative increase tendency of the emission cross-section is shown in order of sample compositions (12)<(14)<(13) and (18)<(22)<(13).

Table 1 shows various composition examples of $Mg(PO_3)_2$—$BaF_2$—$CaF_2$ glasses doped with $ErF_3$.

TABLE 1

| Glass labels | Chemical composition (mol %) | | | | ρ (g/cm³) |
| --- | --- | --- | --- | --- | --- |
| | $Mg(PO_3)_2$ | $BaF_2$ | $CaF_2$ | $ErF_3$ | (±0.01) |
| A1 | 30 | 49 | 20 | 1 | 4.04 |
| A3 | 30 | 47 | 20 | 3 | 4.06 |
| A5 | 30 | 45 | 20 | 5 | 4.09 |
| B1 | 40 | 39 | 20 | 1 | 4.17 |
| B3 | 40 | 37 | 20 | 3 | 4.23 |
| B5 | 40 | 35 | 20 | 5 | 4.26 |
| C1 | 50 | 29 | 20 | 1 | 4.30 |
| C3 | 50 | 27 | 20 | 3 | 4.35 |
| C5 | 50 | 25 | 20 | 5 | 4.38 |

Figure 8:
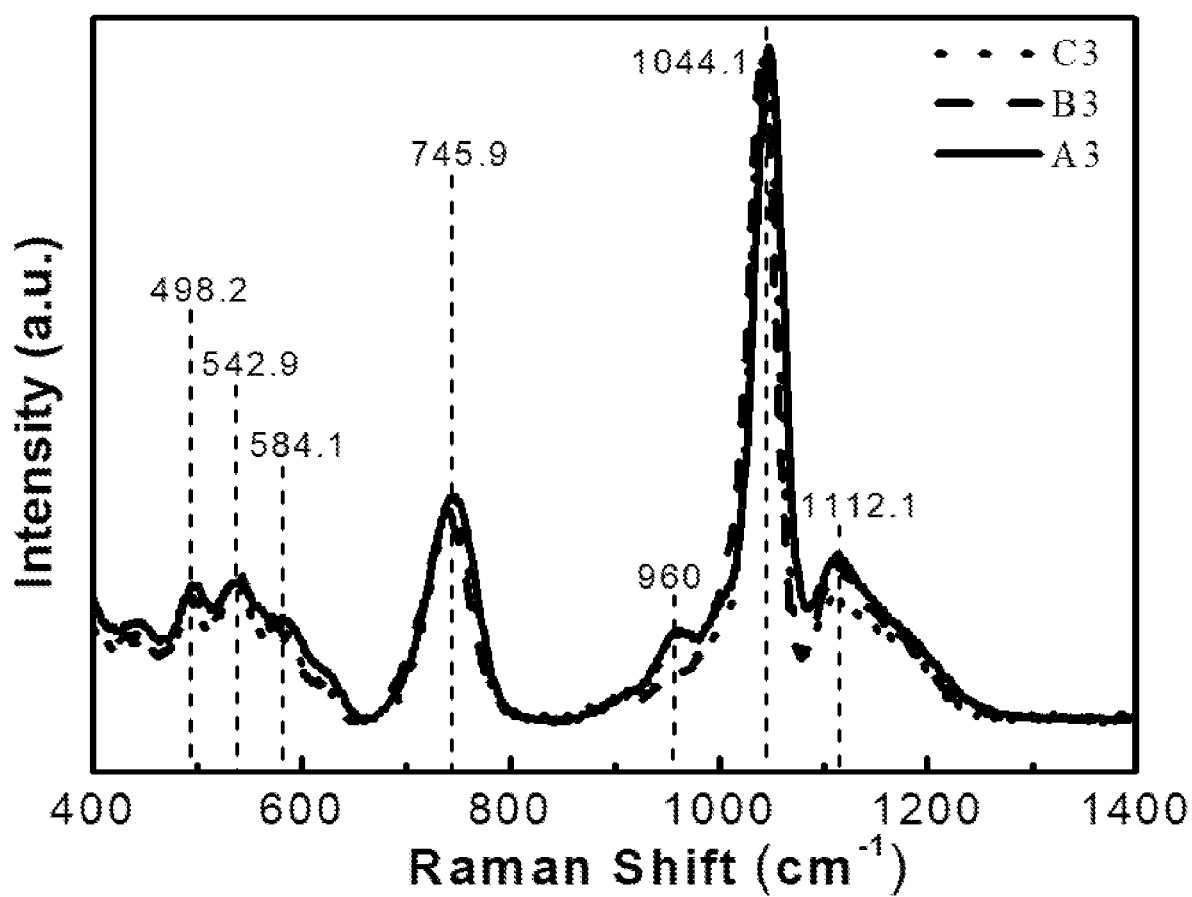
FIG. 8 is a diagram showing Raman Spectra of the glass compositions (A3, B3, and C3) of Table 1.

FIG. 8 is a diagram showing a Raman spectrum of the glass compositions (A3, B3, and C3) of Table 1.

Referring to FIG. 8, it can be seen that Raman band at 498 $cm^{-1}$ is in association with M-F bonding. In this case, M is a bivalent positive ion such as $Mg^{2+}$, $Ba^{2+}$, $Ca^2$.

Further, bands derived from 542.9 $cm^{-1}$, 584.1 $cm^{-1}$, 745.9 $cm^{-1}$ correspond to a P—O—P group, and a band at 1044.1 $cm^{-1}$ and a shoulder at 960 $cm^{-1}$ are caused by stretching vibration of $P_2(O, F)_7$ and $PO_4$.

Further, from this Raman analysis, it is possible to clearly find formation of P—F bonds and a vitreous structure in the fluorophosphate glasses doped with Er according to the present embodiment.

Figure 9:
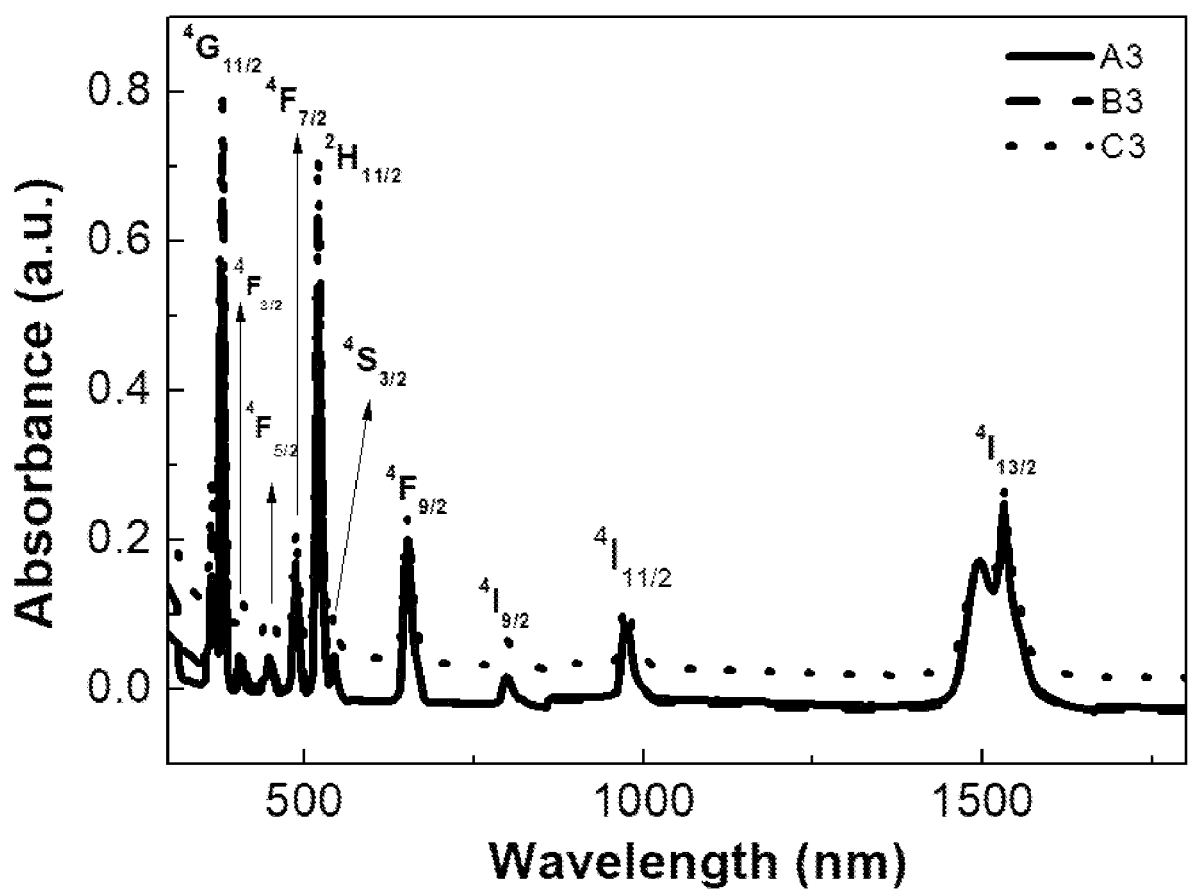
FIG. 9 is a diagram showing optical absorption spectra of the glass compositions (A3, B3, and C3) of Table 1.

FIG. 9 a diagram showing optical absorption spectra of the glass compositions (A3, B3, and C3) of Table 1.

Referring to FIG. 9, it can be seen that the observed absorption bands are caused by 4f-4f transition of $Er^{3+}$ ions. The intensity of the absorption bands increases with an increase in concentration of metaphosphate and the increase in concentration of metaphosphate increases the —PO bonds, which is determined because of an increase in amount of $Er^{3+}$ active ions. Further, it can be seen that the bands observed at 975 nm are necessary for $Er^{3+}$ emission.

Figure 10:
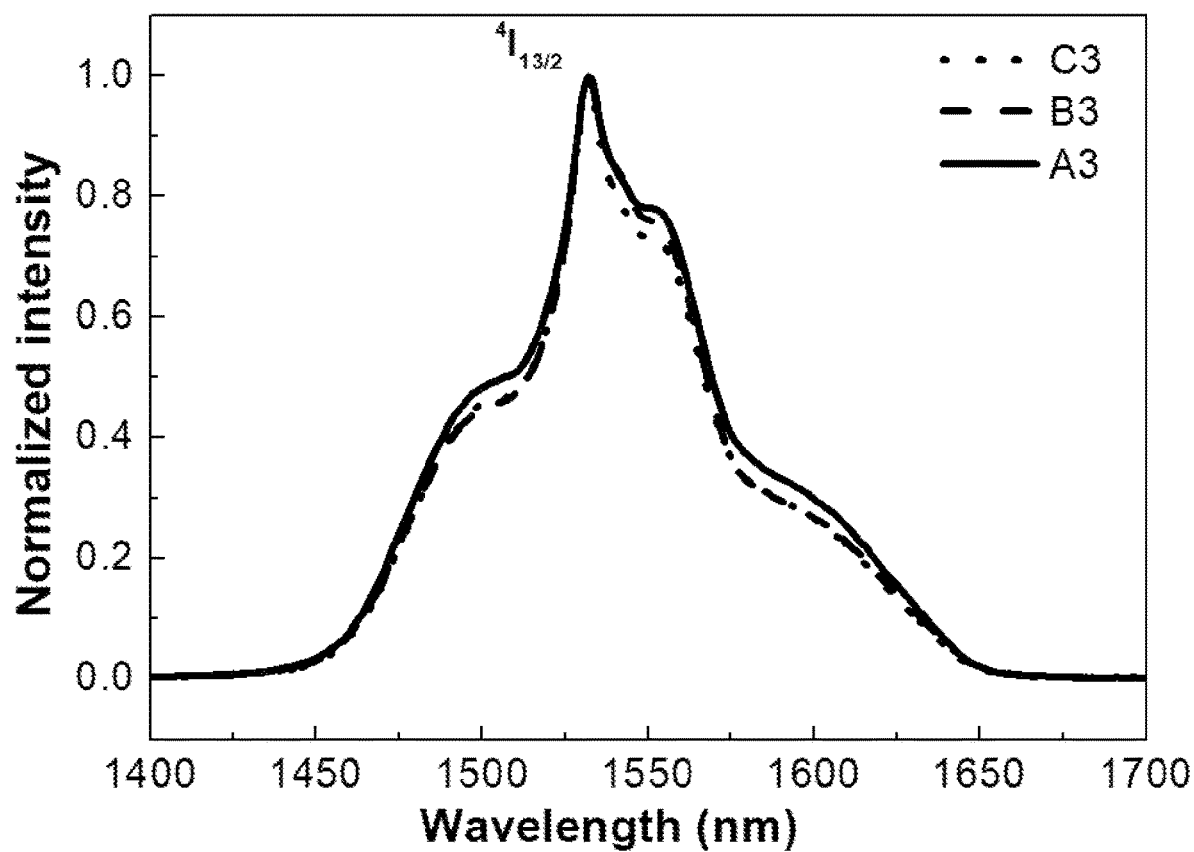
FIG. 10 is a diagram showing emission spectra of the glass compositions (A3, B3, and C3) of Table 1.

FIG. 10 is a diagram showing emission spectra of the glass compositions (A3, B3, and C3) of Table 1.

Referring to FIG. 10, specific bands at 1.53 um are caused by $^4I_{13/2} \rightarrow ^4I_{15/2}$ transition of $Er^{3+}$ ions in oscillation of 980 nm.

Further, the concentration of $Mg(PO_3)_2$ increases and the intensity of bands correspondingly increases until the concentration of $Mg(PO_3)_2$ reaches 40 mol %, which is determined because an increase in concentration of metaphosphate increases —PO bonds and the amount of active ions of $Er^{3+}$ correspondingly increases.

That is, when the concentration of $Mg(PO_3)_2$ increases higher than 40 mol %, the intensity of bands decreases, so it is possible to find that the emission intensity depends on a composition.

Meanwhile, in the present embodiment, it can be seen that the full width at half maximum (FWHM) can reach 86.5 nm.

Figure 11:
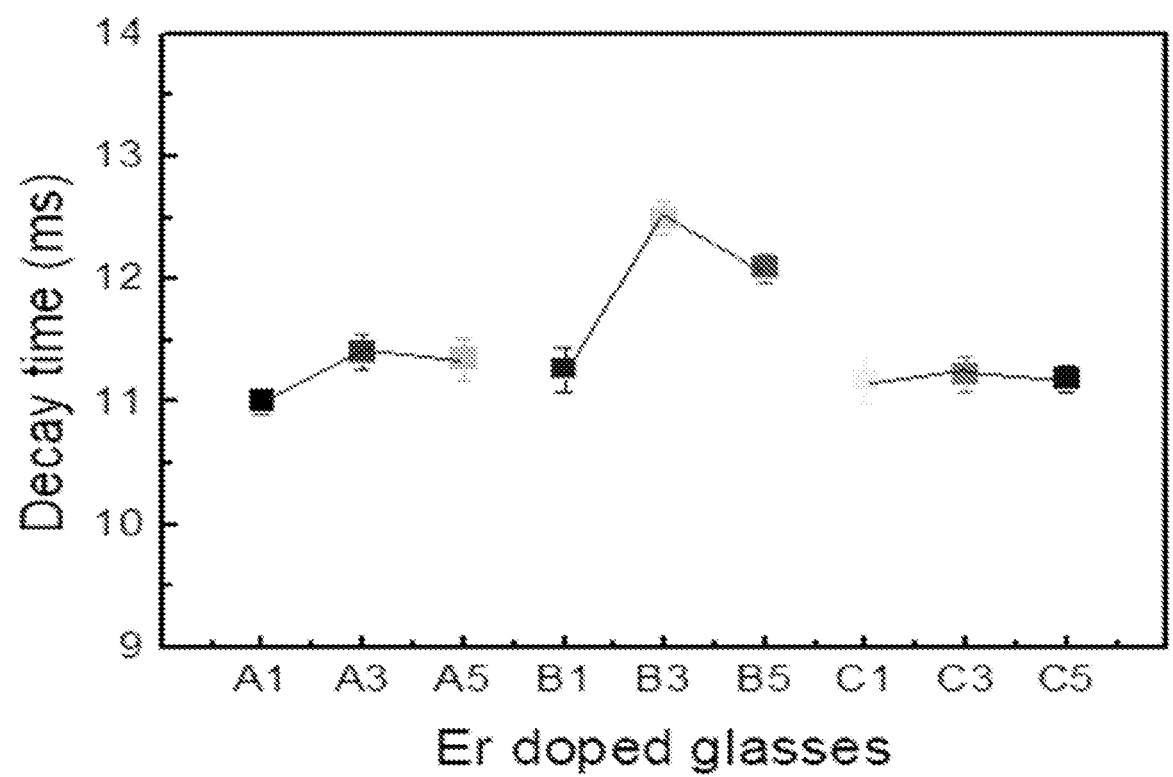
FIG. 11 is a diagram showing emission lifetimes of the glass compositions of Table 1.

FIG. 11 is a diagram showing emission lifetimes of the glass compositions of Table 1.

Referring to FIG. 11, the attenuation curve of a $^4I_{13/2}$ level commonly shows a single exponential nature in the entire concentration change.

Accordingly, when determining the emission lifetime using single exponential fitting, the emission lifetime shows about 12.5 ms when the concentration of $Mg(PO_3)_2$ is 40 mol %.

Meanwhile, as the concentration of $Mg(PO_3)_2$ increases (>40 mol %), the emission lifetime shows a tendency of decreasing, which is determined as being caused by higher phonon energy.

Figure 12A:
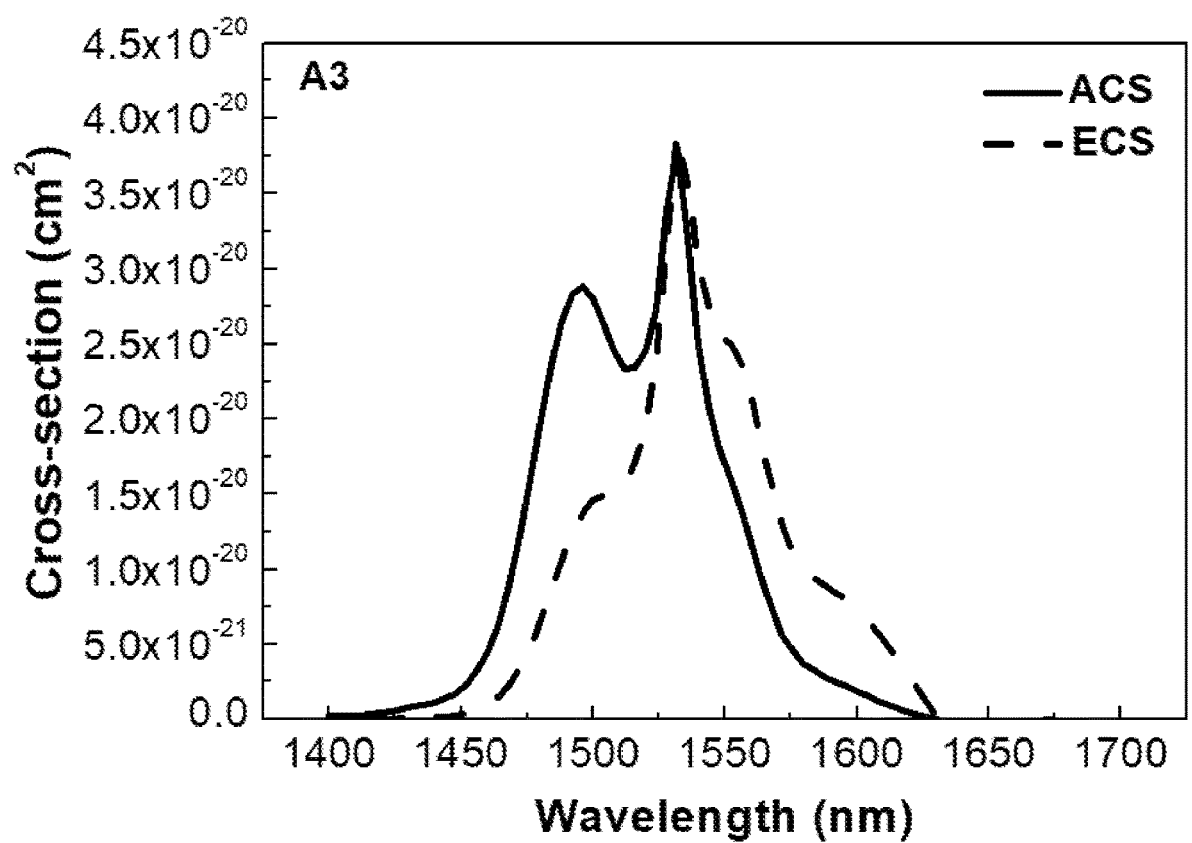
FIGS. 12A, 12B, and 12C are diagrams showing absorption cross-sections (ACS) and emission cross-sections (ECS) of the glass compositions (A3, B3, and C3) of Table 1.
Figure 12B:
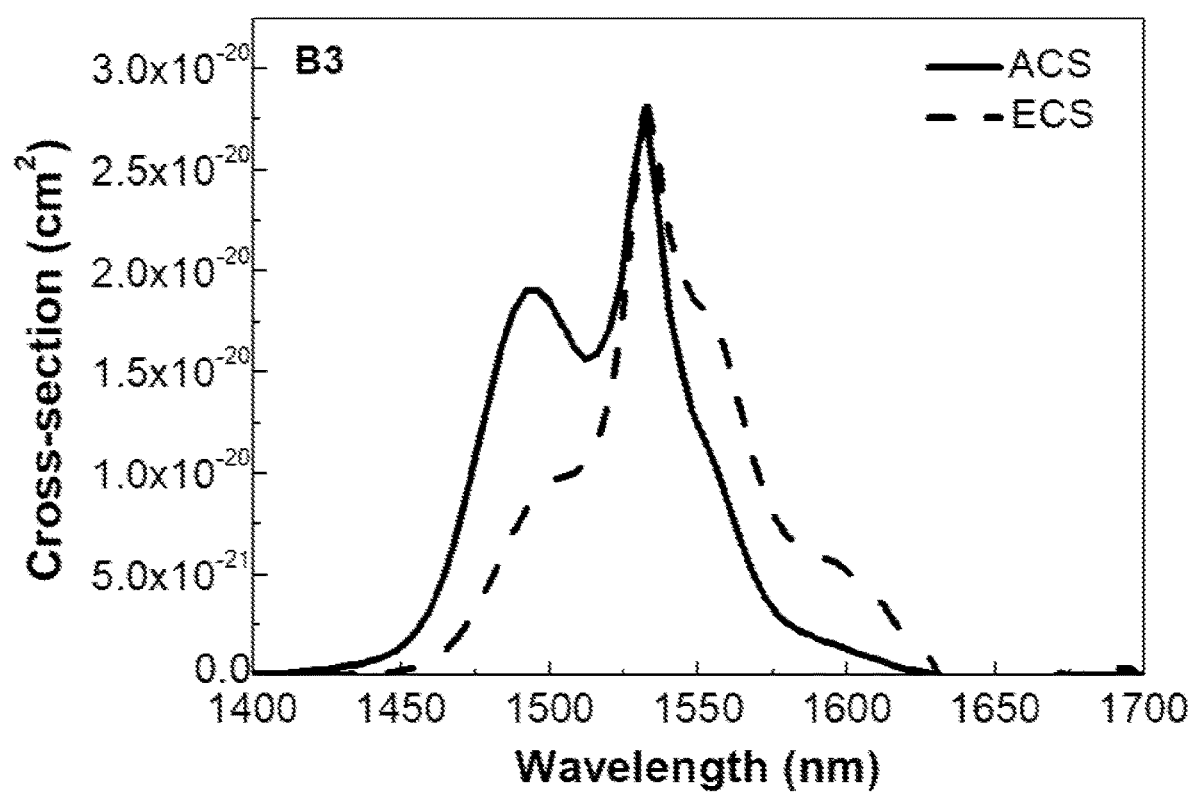
Figure 12C:
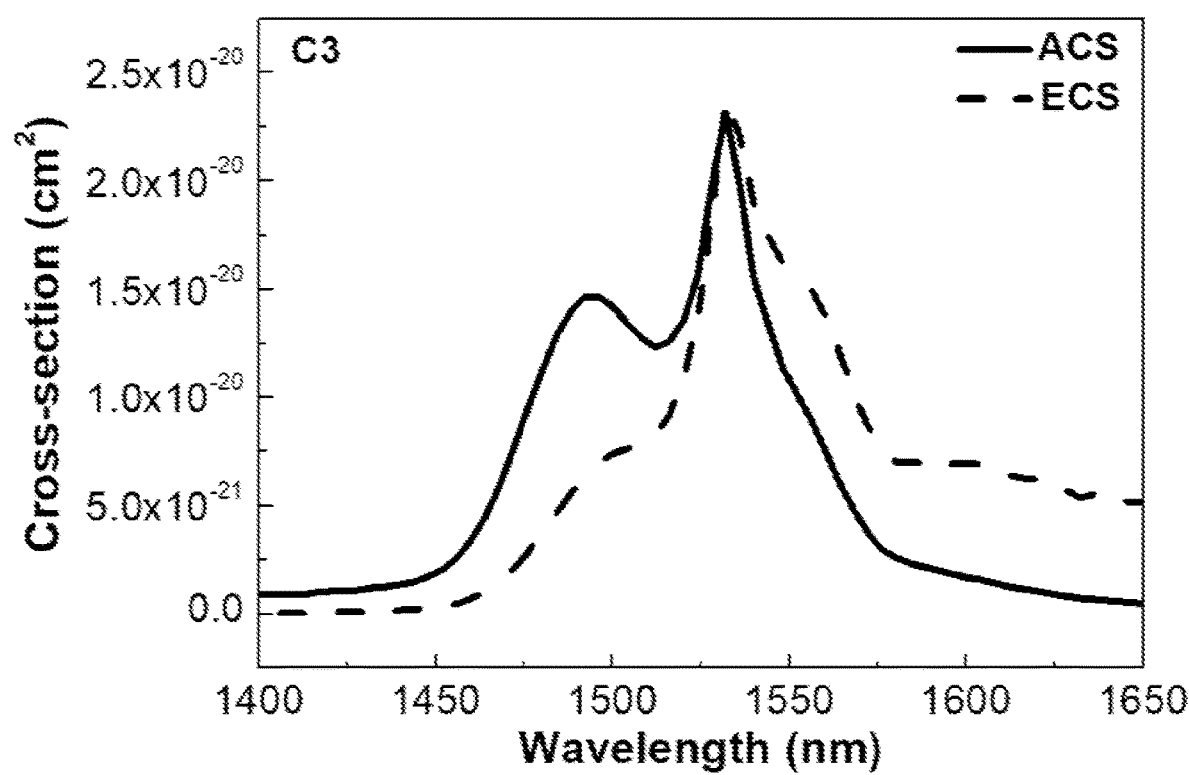

FIGS. 12A, 12B, and 12C are diagrams showing absorption cross-sections (ACS) and emission cross-sections (ECS) of the glass compositions (A3, B3, and C3) of Table 1.

In FIGS. 12A, 12B, and 12C, the absorption cross-sections (ACS) and the emission cross-sections (ECS) are determined by McCumber theory, and the ACS and the ECS show tendency of decrease with an increase in concentration of $Mg(PO_3)_2$, which is determined as being caused by local structural changes in the site of Er.

Figure 13A:
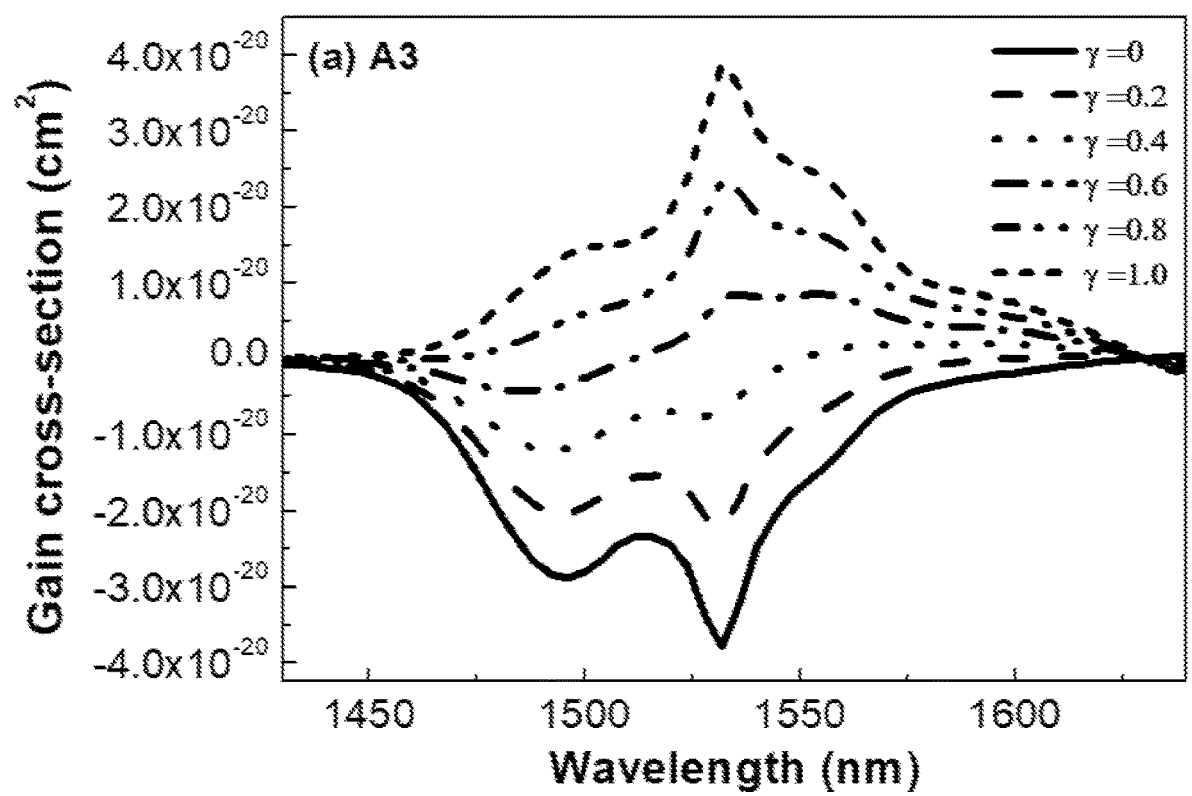
FIGS. 13A, 13B, and 13C are diagrams showing gain cross-sectional spectra of the glass compositions (A3, B3, and C3) of Table 1.
Figure 13B:
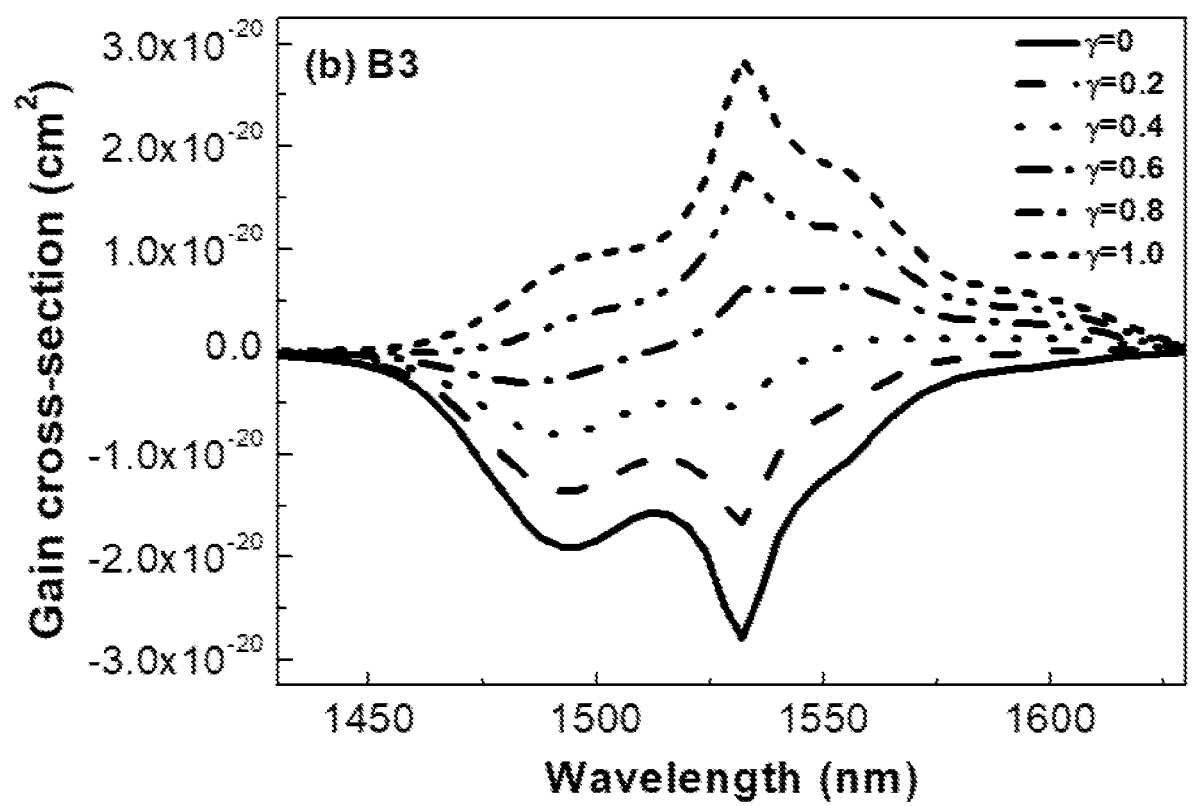
Figure 13C:
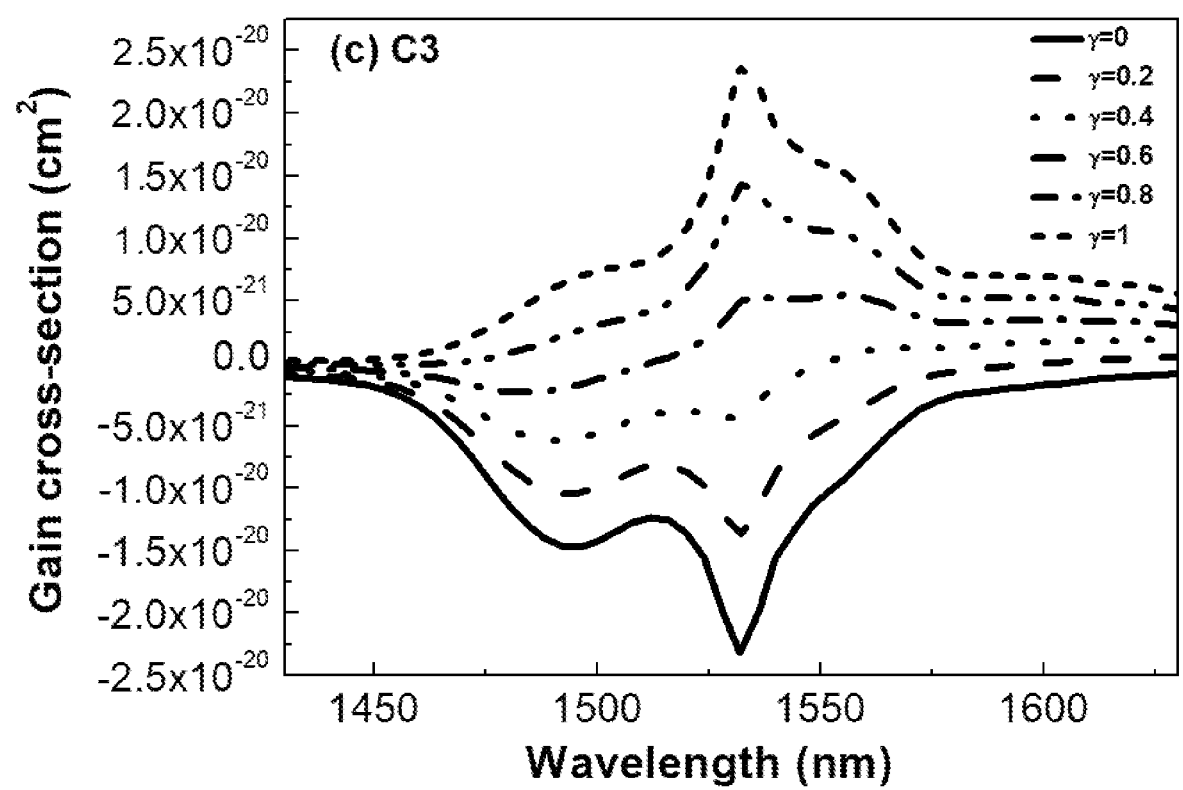

FIGS. 13A, 13B, and 13C are diagrams showing gain cross-sectional spectra of the glass compositions (A3, B3, and C3) of Table 1.

Referring to FIG. 13, it can be seen that when population inversion y is 60% or more in the entire mole ratio range of $Mg(PO_3)_2$, the Gain value is positive and a flat gain is obtained in the range of 1450 nm to 1630 nm.

This wavelength range (1450 nm to 1630 nm) covers C and L telecommunication bands, which is determined as a characteristic suitable to be used in the WDM network field.

Figure 14:
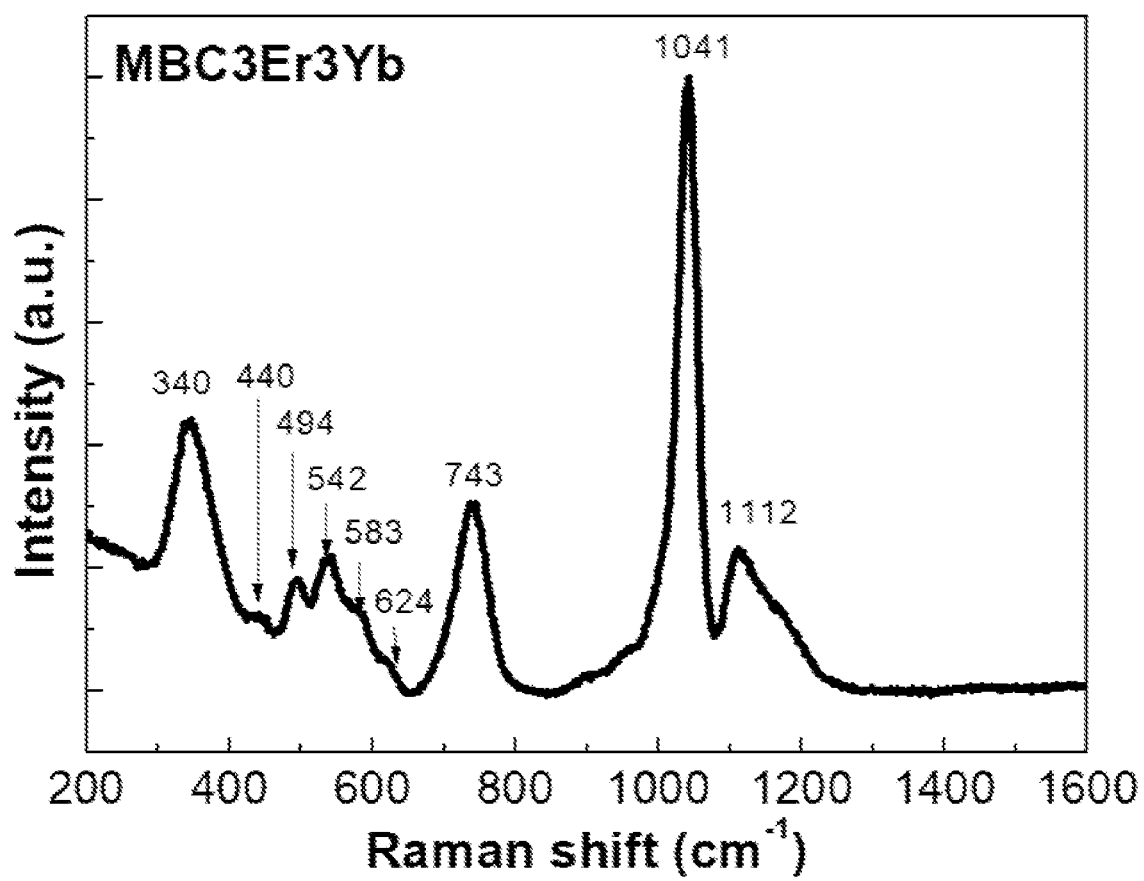
FIG. 14 is a diagram showing a Raman spectrum of fluorophosphate glass with Er/Yb co-doped according to another embodiment of the present disclosure.

FIG. 14 is a diagram showing Raman spectra of fluorophosphate glass with Er/Yb co-doped in accordance with another embodiment of the present disclosure.

Referring to FIG. 14, it can be seen that the fluorophosphate glass with Er/Yb co-doped in accordance with another embodiment of the present disclosure has Raman bands in 494 to 624 $cm^{-1}$ region related to a fluoride group and a prominent band of 1041 $cm^{-1}$ related to a phosphate group.

Further, from this Raman analysis, it is possible to clearly find formation of P—F bonds in the fluorophosphate glass with Er/Yb co-doped in accordance with the present embodiment.

Figure 15:
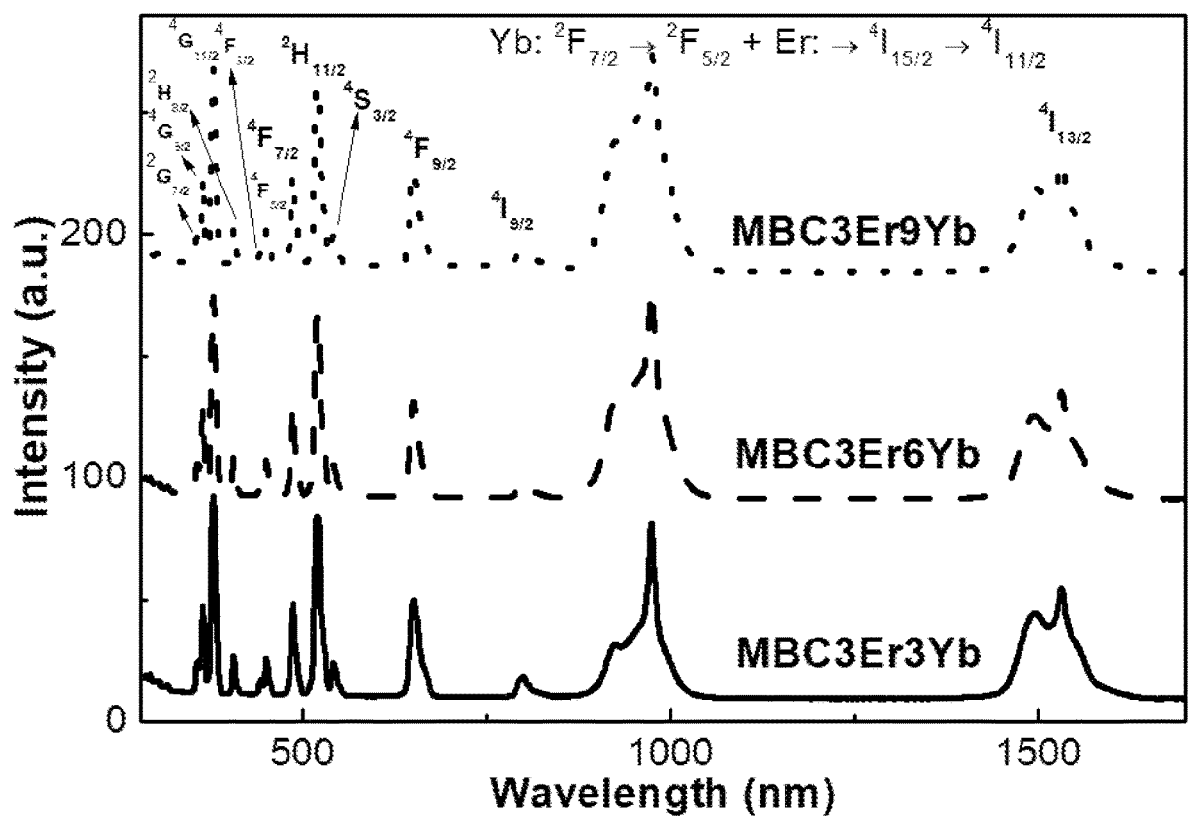
FIG. 15 is a diagram showing optical absorption spectra of the fluorophosphate glass with Er/Yb co-doped of FIG. 14.

FIG. 15 is a diagram showing optical absorption spectra of the fluorophosphate glass with Er/Yb co-doped of FIG. 14.

Referring to FIG. 15, it can be seen that the absorption bands observed in the fluorophosphate glass with Er/Yb co-doped are caused by 4f-4f transition of $Er^{3+}$ ions.

Further, it can be seen that prominent and broad bands formed at 975 nm are related to $Er^{3+}$ ions and $Yb^{3+}$ ions.

Further, it can be seen the intensity in the prominent bands increases with an increase in concentration of $Yb^{3+}$.

Accordingly, it is possible to find that co-doping Er/Yb makes Er emission in oscillation of 980 nm more efficient.

Figure 16:
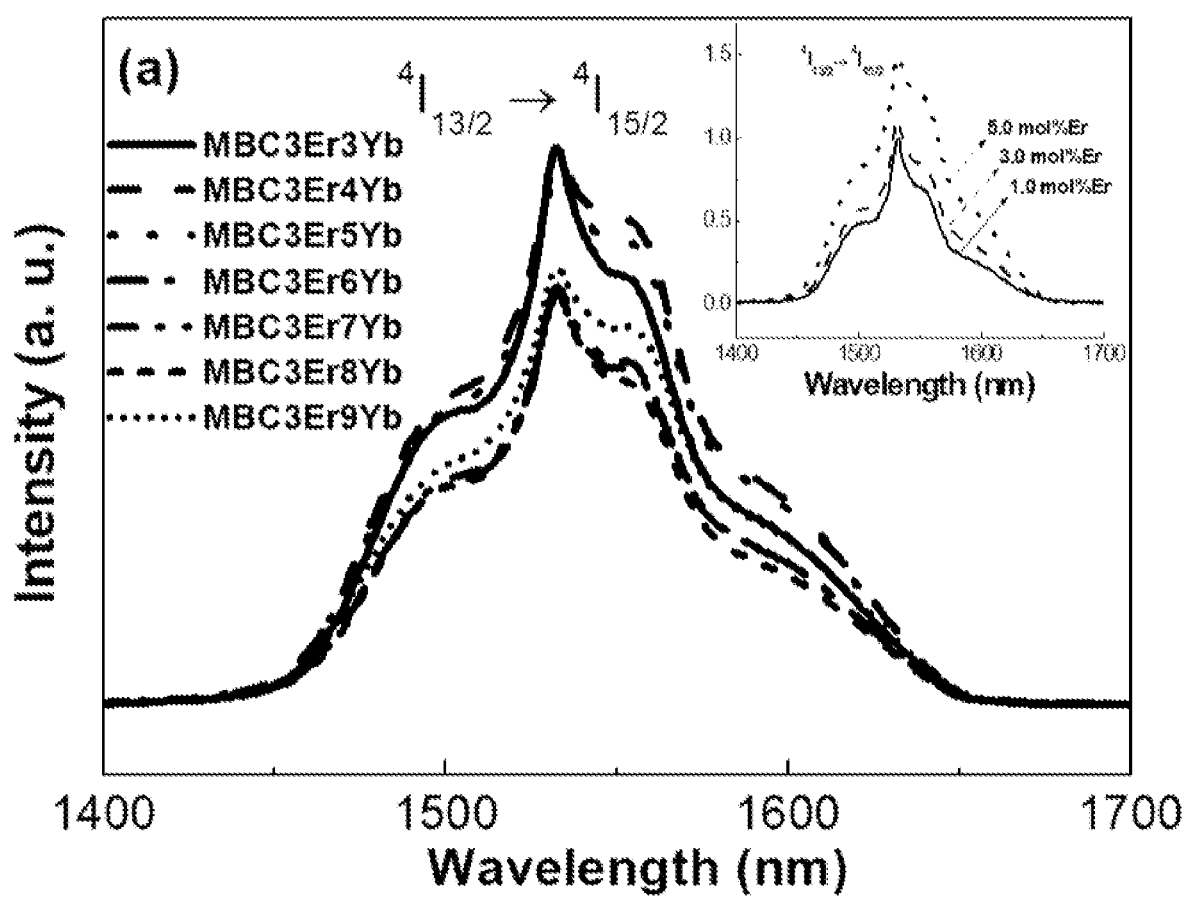
FIGS. 16 and 17 are diagrams respectively showing changes of emission spectra and effective bandwidths according to the concentration of $Yb^{3+}$ in the fluorophosphate glass with Er/Yb co-doped of FIG. 14.
Figure 17:
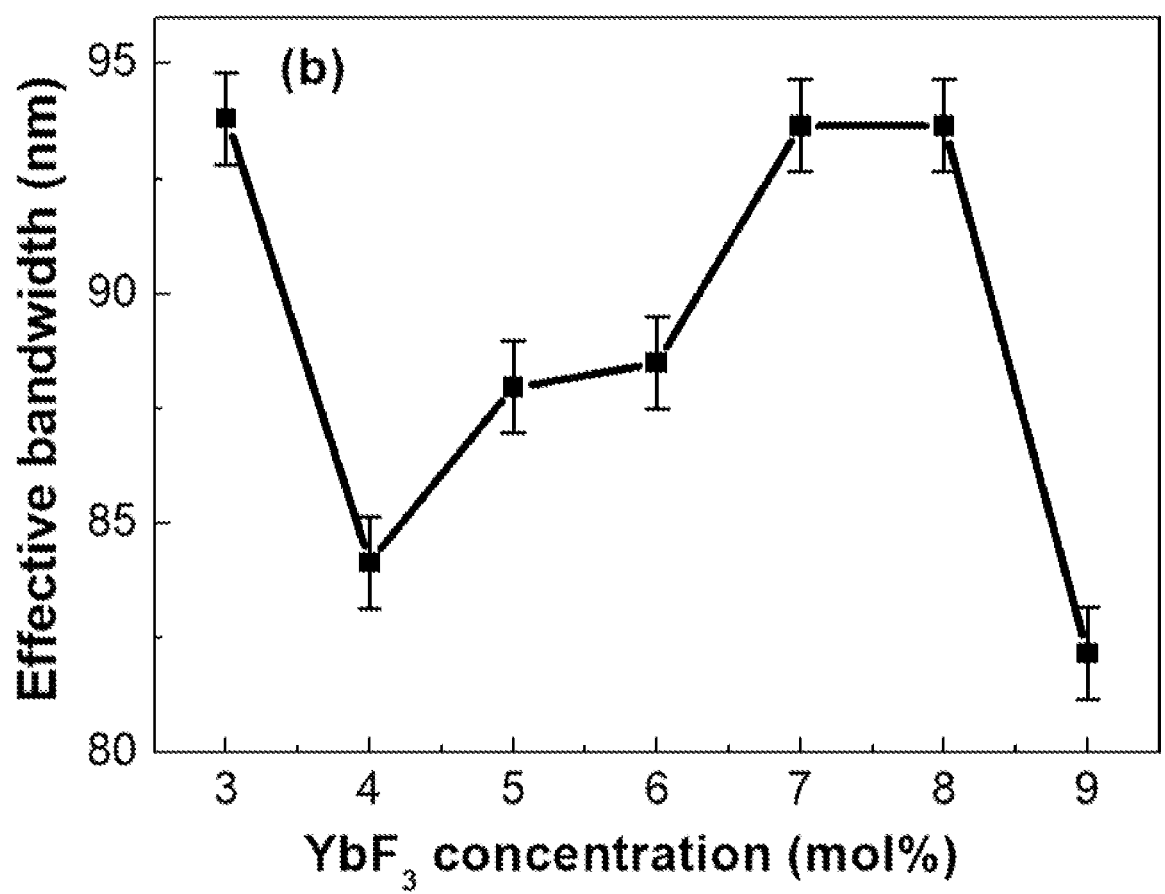

FIGS. 16 and 17 are diagrams respectively showing emission spectra and effective bandwidths according to the concentration of $Yb^{3+}$ in the fluorophosphate glass with Er/Yb co-doped of FIG. 14.

Referring to FIGS. 16 and 17, it is found that characteristic bands at 1.53 um are caused by $^4I_{13/2} \rightarrow ^4I_{15/2}$ transition of $Er^{3+}$ ions at oscillation of 980 nm.

Further, it is found that the characteristic bands at 1.53 um increase with an increase in concentration of $Yb^{3+}$, the limit is reached when the concentration of $Yb^{3+}$ reaches 4.0 mol %, and decrement according to an increase of $Yb^{3+}$ is caused by concentration quenching.

Accordingly, the optimum value of $Yb^{3+}$ concentration is 4.0 mol %.

Further, it is found that bandwidths exist in the range of 82 to 93 nm in accordance with the concentration change of $Yb^{3+}$.

Figure 18:
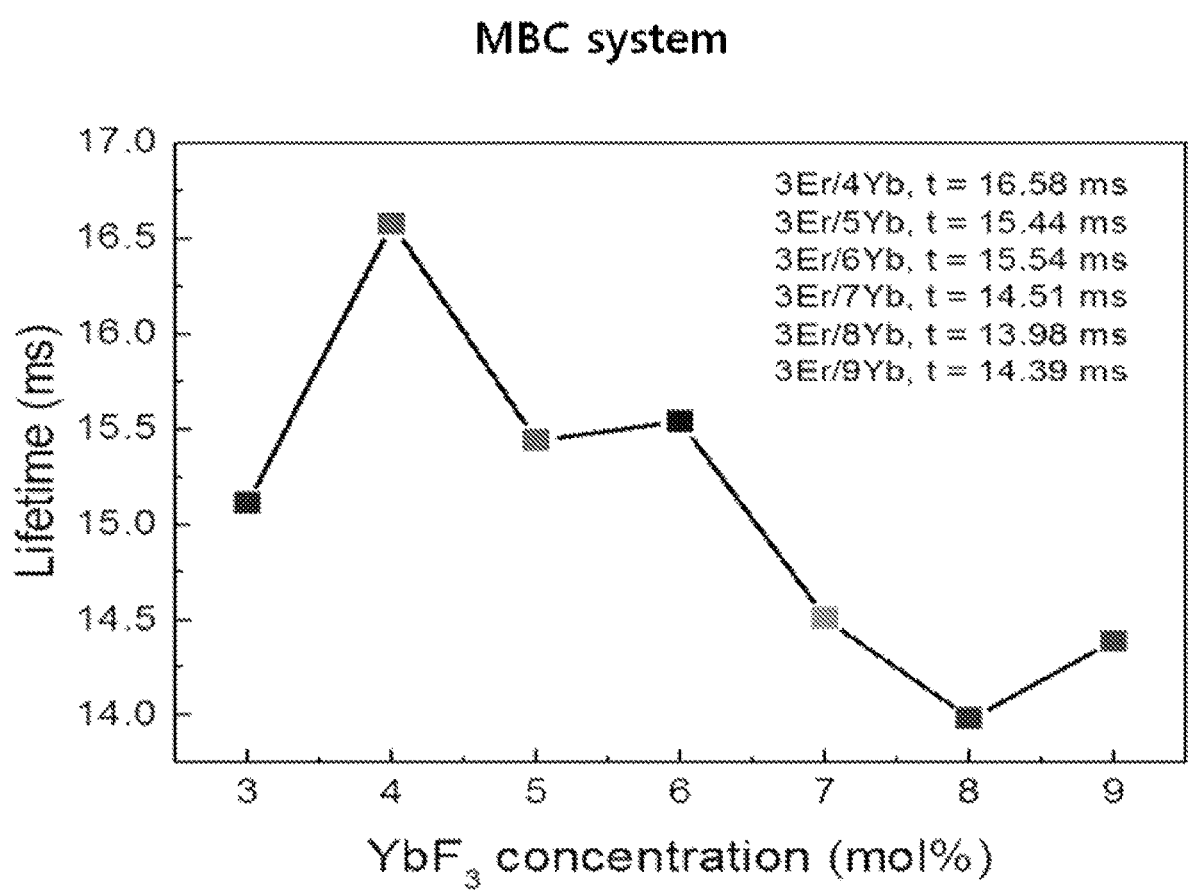
FIG. 18 is a diagram showing an emission lifetime according to the concentration of $Yb^{3+}$ in the fluorophosphate glass with Er/Yb co-doped of FIG. 14.

FIG. 18 is a diagram showing an emission lifetime according to the concentration of $Yb^{3+}$ in the fluorophosphate glass with Er/Yb co-doped of FIG. 14.

Referring to FIG. 18, the attenuation curve of $^4I_{13/2}$ level commonly shows a single exponential nature in the entire concentration change of $Yb^{3+}$.

Accordingly, when determining the emission lifetime using single exponential fitting, the emission lifetime shows 14.39 to 15.11 ms in the entire concentration change of $Yb^{3+}$.

Meanwhile, as the concentration of $Yb^{3+}$ increases, the emission lifetime shows tendency of decreasing, which is determined as being caused by back energy transfer from $Er^{3+}$ to $Yb^{3+}$ at high dopant concentration.

Further, it is possible to derive the optimum concentration ratio of 3:4 of Er/Yb.

The reason that the carrier lifetime increases at a metastable state energy level, which is stimulated-emitted when a specific mol % ratio of Er/Yb is maintained in $Mg(PO_3)_2$-(50-x)$BaF_2$—$CaF_2$:$3ErF_3$/$xYbF_3$ that is fluorophosphate glass composition with Er/Yb co-doped, is because an energy transfer phenomenon occurs between erbium (Er) and ytterbium (Yb), and ytterbium (Yb) ions decrease the non-radiative process of erbium (Er) ions.

The reason that the ytterbium (Yb) ions decrease the non-radiative process of erbium (Er) ions is because the ion radii of the erbium (Er) ions and the ytterbium (Yb) ions are similar to each other and there is a cluster formation effect generated by erbium (Er) and ytterbium (Yb).

Figure 19:
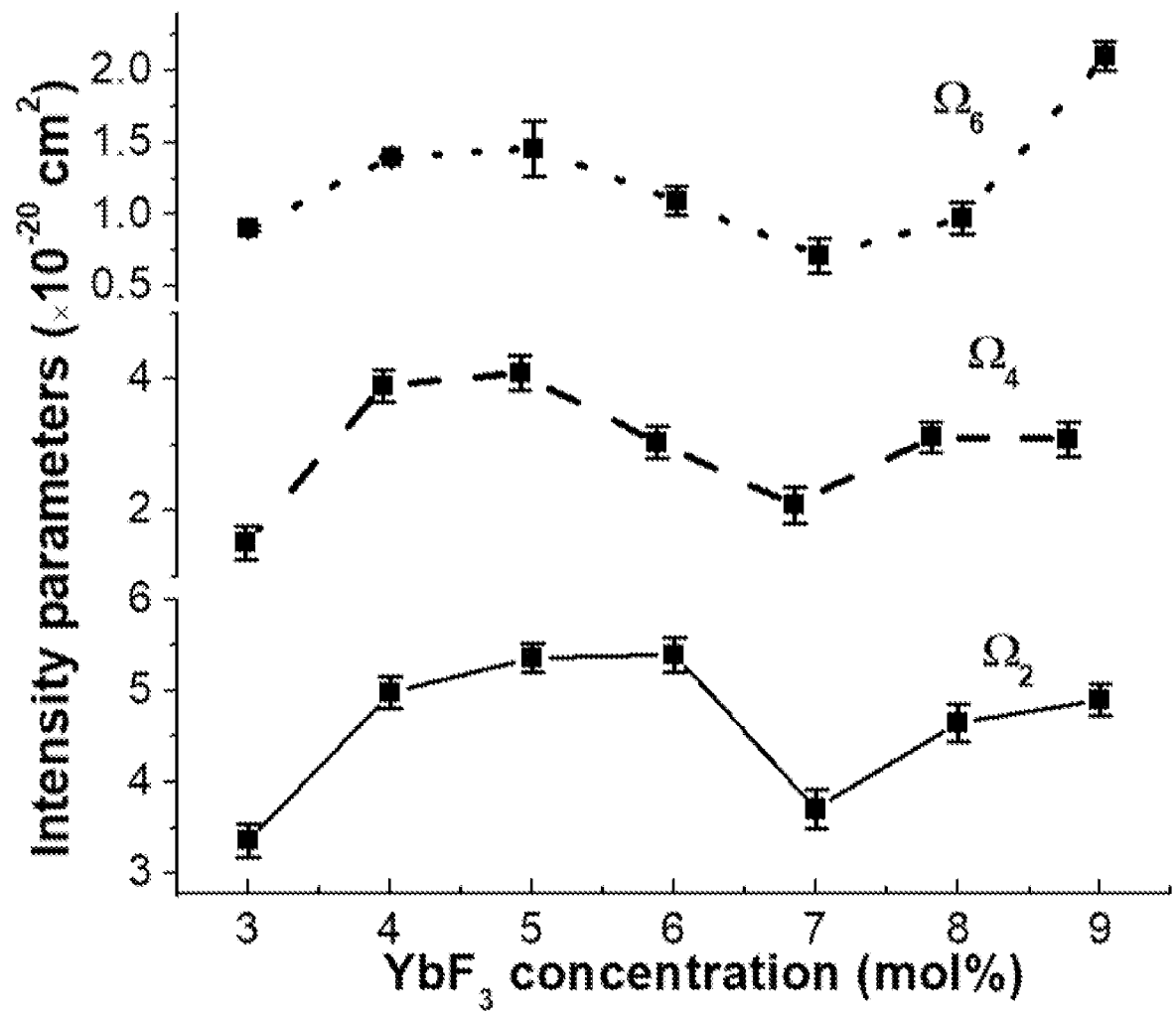
FIG. 19 is a diagram showing changes of JO intensity parameters ($\Omega_2$, $\Omega_4$, and $\Omega_6$) according to the concentration of $Yb^{3+}$ in the fluorophosphate glass with Er/Yb co-doped of FIG. 14.

FIG. 19 is a diagram showing changes of JO intensity parameters ($\Omega_2$, $\Omega_4$, and $\Omega_6$) according to the concentration of $Yb^{3+}$ in the fluorophosphate glass with Er/Yb co-doped of FIG. 14.

Referring to FIG. 19, $\Omega_2$ of the JO intensity parameters shows that high covalency exists in asymmetry between an Er—O bond and an Yb concentration increase.

Further, $\Omega_4$, and $\Omega_6$ of the JO intensity parameters show that rigidity and viscosity of a fluorophosphate matrix are improved by an increase in concentration of Yb.

Figure 20:
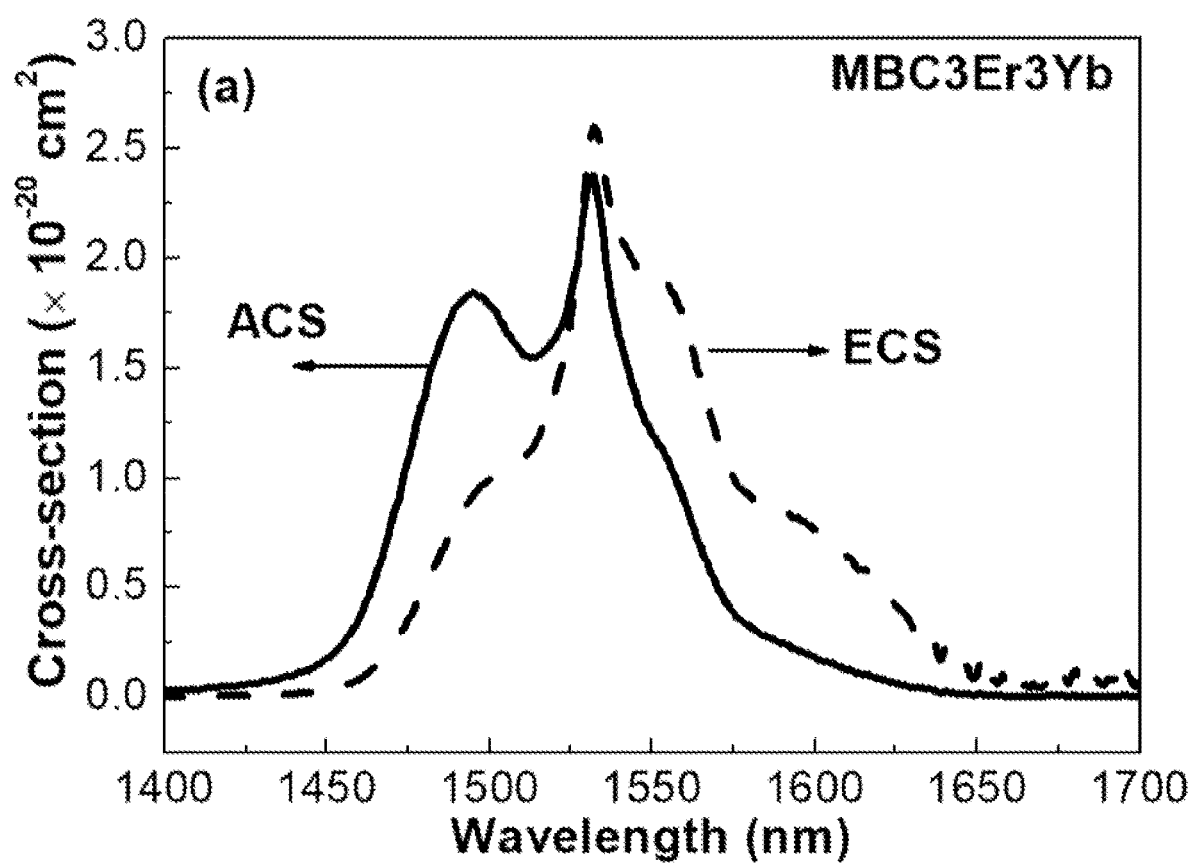
FIGS. 20 and 21 are diagrams showing absorption cross-sections (ACS) and emission cross-sections (ECS) according to the concentration of $Yb^{3+}$ in the fluorophosphate glass with Er/Yb co-doped of FIG. 14.
Figure 21:
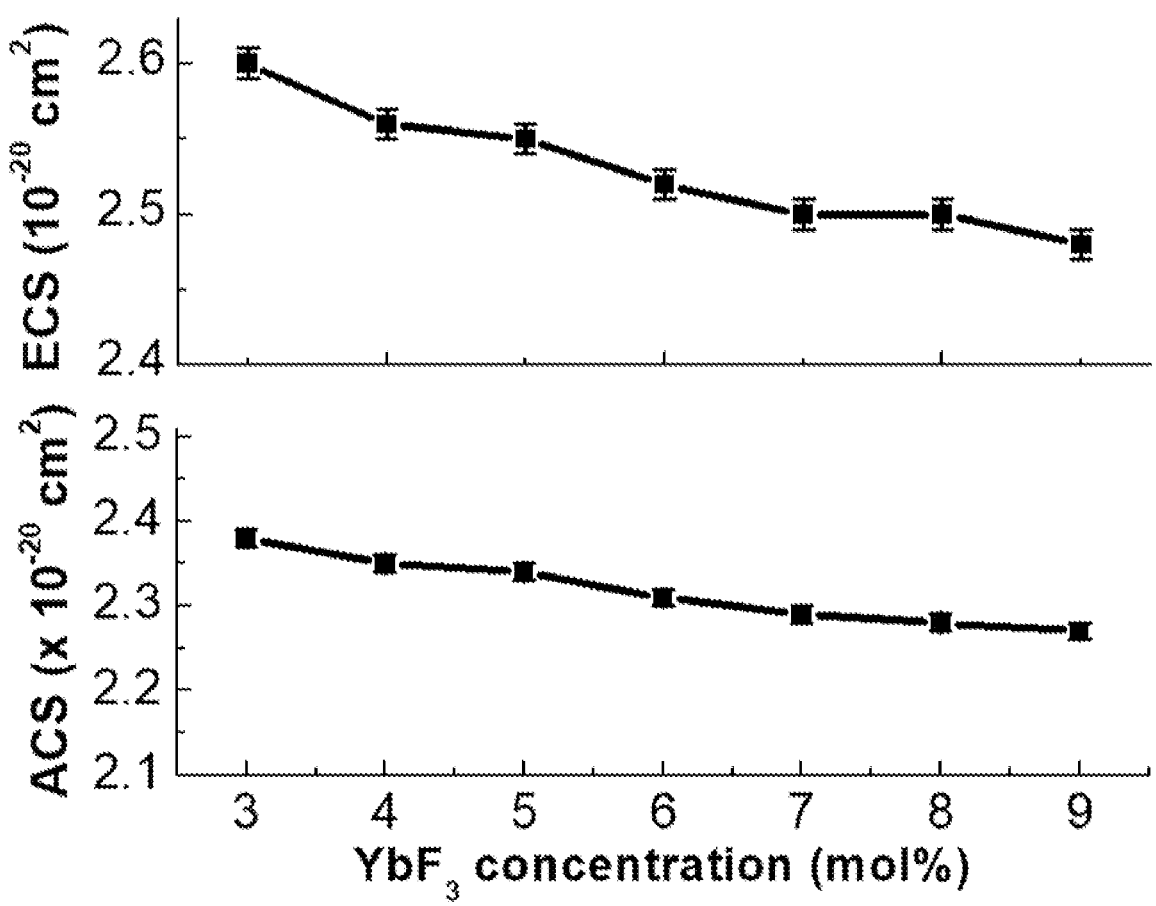

FIGS. 20 and 21 are diagrams showing absorption cross-sections (ACS) and emission cross-sections (ECS) according to the concentration of $Yb^{3+}$ in the fluorophosphate glass with Er/Yb co-doped of FIG. 14.

In FIGS. 20 and 21, the absorption cross-section (ACS) and the emission cross-section (ECS) are determined by McCumber theory and, as the concentration of $Yb^{3+}$ increases, the ACS and ECS show tendency of decreasing, which is determined as being caused by back energy transfer from $Er^{3+}$ to $Yb^{3+}$ at high dopant concentration.

Figure 22:
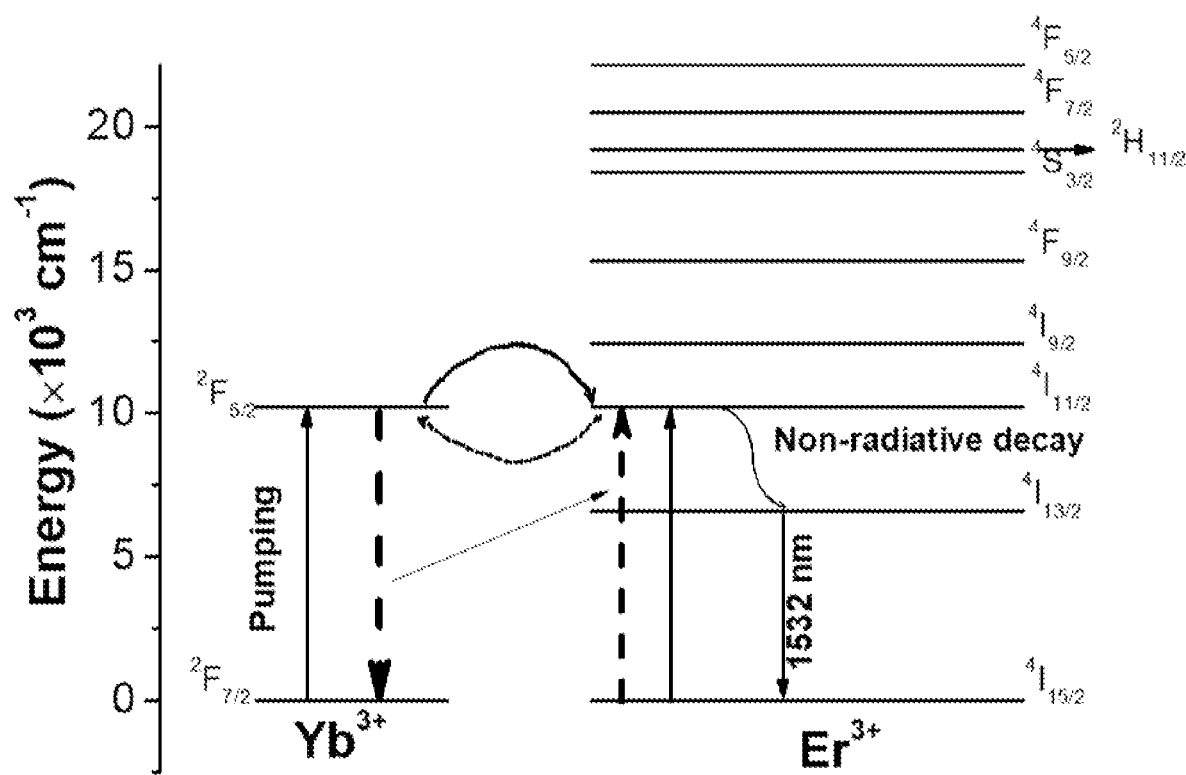
FIG. 22 is an energy level diagram illustrating an absorption and emission phenomenon of photons in an Er/Yb system.

FIG. 22 is an energy level diagram illustrating an absorption and emission phenomenon of photons in an Er/Yb system.

Referring to FIG. 22, it can be seen when Er/Yb are co-doped, the system operates through three energy levels (three level laser).

In this case, it can be seen that an energy transition phenomenon occurs between $^2F_{7/2}{}^2F_{5/2}$ transition of ytterbium (Yb) and $^4I_{15/2}{}^4I_{11/2}$ transition of erbium (Er) and the non-radiative transition phenomenon to $^4I_{11/2}{}^4I_{13/2}$ of erbium (Er) is complexly shown, thereby influencing the carrier lifetime at $^4I_{13/2}$.

When the concentration of ytterbium (Yb) increases from 3 mol % to 4 mol %, $^2F_{7/2}{}^2F_{5/2}$ transition of ytterbium (Yb) and $^4I_{15/2}{}^4I_{11/2}$ transition of erbium (Er) overlap, so the energy transfer phenomenon from ytterbium (Yb) to erbium (Er) increases, thereby increasing the effect that the ytterbium (Yb) ions decrease the radiative process of the erbium (Er) ions. Accordingly, the carrier lifetime at $^4I_{13/2}$ increases.

In contrast, when the concentration of ytterbium (Yb) increases over 4 mol %, the energy transfer phenomenon is increased from $^4I_{15/2}{}^4I_{11/2}$ transition of erbium (Er) to $^2F_{7/2}{}^2F_{5/2}$ transition of ytterbium (Yb), thereby decreasing the carrier lifetime at $^4I_{13/2}$.

That is, referring to FIG. 22 together with FIG. 18, it can be seen that when the mol % ratio of erbium (Er)/ytterbium (Yb) is 3:4, the energy transfer phenomenon from ytterbium (Yb) to erbium (Er) is effective on the emission long-lifetime at the $^4I_{13/2}$ energy level.

Figure 23:
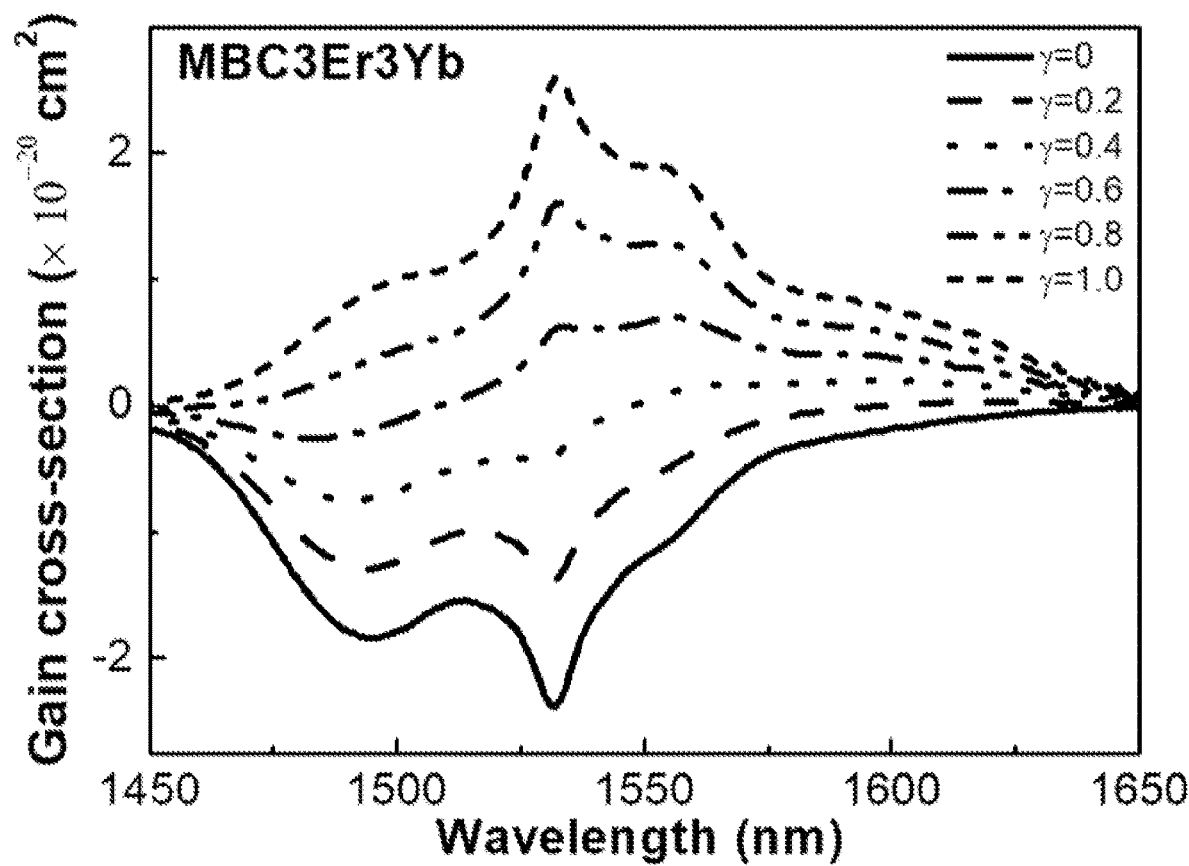
FIG. 23 is a diagram showing gain cross-sectional spectra according to a change value of population inversion y in the fluorophosphate glass (Er/Yb is 3:3) with Er/Yb co-doped of FIG. 14.

FIG. 23 is a diagram showing gain cross-sectional spectra according to a change value of population inversion y in the fluorophosphate glass (Er/Yb is 3:3) with Er/Yb co-doped of FIG. 14.

Referring to FIG. 23, it can be seen that when population inversion y is 40% or more, the gain is a positive value and a flat gain is obtained in the range of 1450 nm to 1650 nm.

This wavelength range (1450 nm to 1650 nm) covers C and L telecommunication bands, which is determined as a characteristic suitable to be used in the WDM network field.

Figure 24:
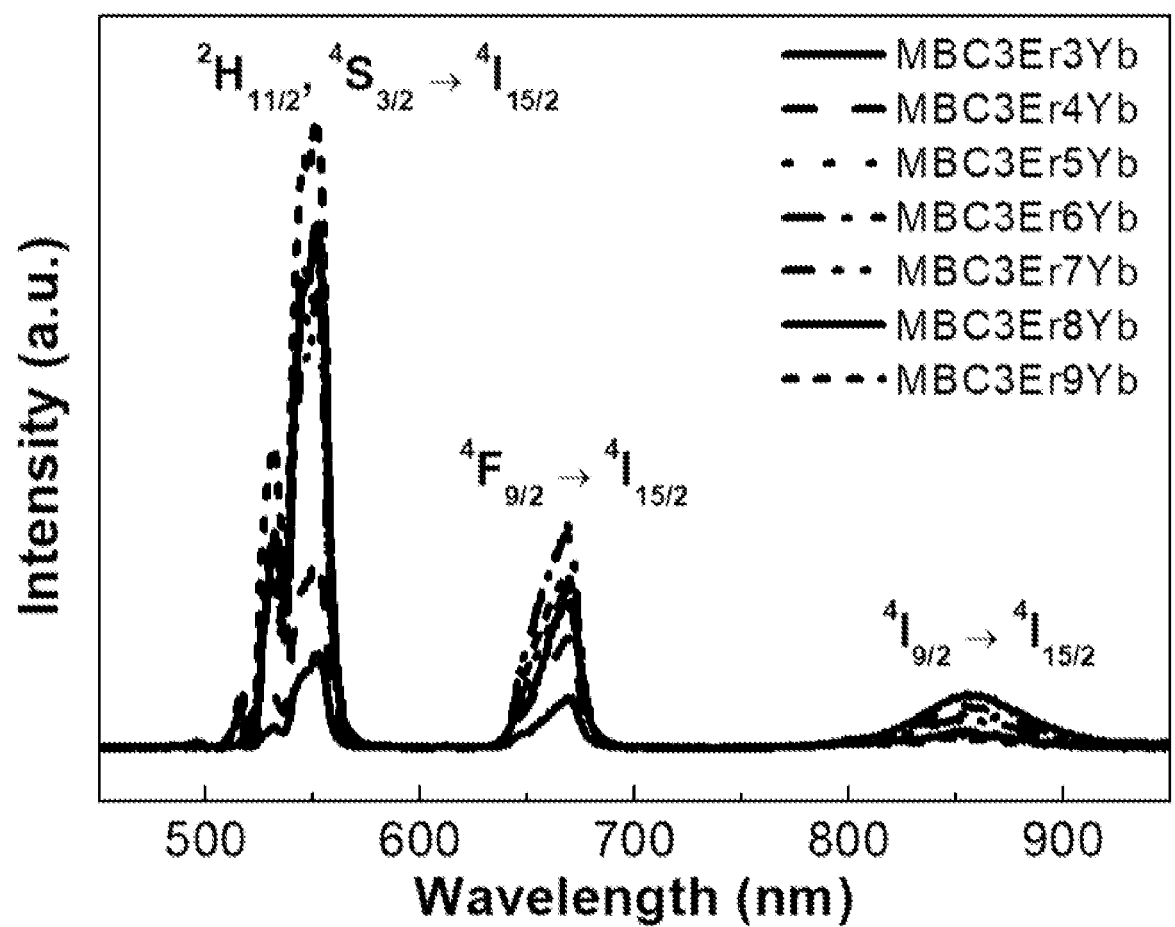
FIG. 24 is a diagram showing upconversion spectra according to several different concentrations of $Yb^{3+}$ in the fluorophosphate glass with Er/Yb co-doped of FIG. 14.

FIG. 24 is a diagram showing upconversion spectra according to several different concentrations of $Yb^{3+}$ in the fluorophosphate glass with Er/Yb co-doped of FIG. 14.

Referring to FIG. 24, up-converted emission of strong green and weak red is shown at diode laser oscillation of 980 nm and it can be seen that the entire intensity of the up-converted signals monotonously increases together with the Yb concentration.

This increment is determined as being caused by efficient energy transfer between Er and Yb.

Figure 25:
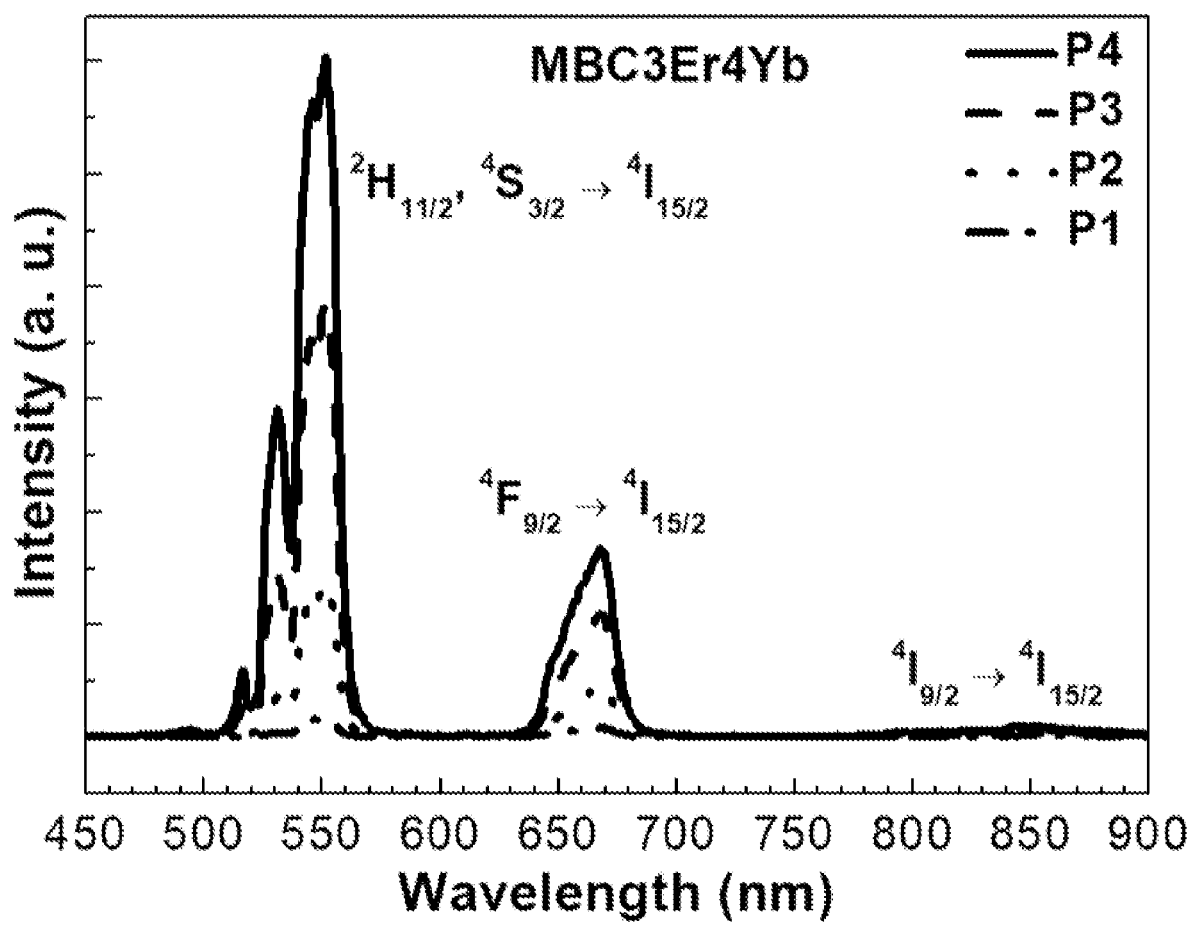
FIG. 25 is a diagram showing upconversion spectra according to pump power (P1, P2, P3, and P4) in the fluorophosphate glass with Er/Yb co-doped of FIG. 14.

FIG. 25 is a diagram showing upconversion spectra according to pump power (P1, P2, P3, and P4) in the fluorophosphate glass with Er/Yb co-doped of FIG. 14.

Referring to FIG. 25, it can be seen that the intensity of up-converted signals monotonously increases with an increase of pump power and two photons are associated with upconversion emission of red and green.

What is claimed is:

1. Fluorophosphate glasses for an active device, comprising:
a metaphosphate composition including $Mg(PO_3)_2$ of about 20 mol % to about 60 mol %;
a fluoride composition including $BaF_2$ of about 20 mol % to about 60 mol % and $CaF_2$ of about 0 mol % to about 40 mol %; and
dopants including rare earth elements,
wherein the dopants are $ErF_3$ and $YbF_3$, the $ErF_3$ is about 3 mol %, and the $YbF_3$ is about 3 mol % to about 6 mol %.

2. The fluorophosphate glasses of claim 1, wherein the $Mg(PO_3)_2$ is about 30 mol %.

3. The fluorophosphate glasses of claim 1, wherein the $CaF_2$ is about 20 mol %.

4. The fluorophosphate glasses of claim 2, wherein the $BaF_2$ is about 40 mol % to about 60 mol % and the $CaF_2$ is about 10 mol % to about 30 mol %.

5. The fluorophosphate glasses of claim 3, wherein the $Mg(PO_3)_2$ is about 30 mol % to about 50 mol % and the $BaF_2$ is about 30 mol % to about 50 mol %.

6. The fluorophosphate glasses of claim 1, wherein the $YbF_3$ is about 4 mol %.

7. The fluorophosphate glasses of claim 6, wherein the $Mg(PO_3)_2$ is about 30 mol %.

8. The fluorophosphate glasses of claim 6, wherein the $CaF_2$ is about 20 mol %.

9. The fluorophosphate glasses of claim 7, wherein the $BaF_2$ is about 40 mol % to about 60 mol % and the $CaF_2$ is about 10 mol % to about 30 mol %.

10. The fluorophosphate glasses of claim 8, wherein the $Mg(PO_3)_2$ is about 30 mol % to about 50 mol % and the $BaF_2$ is about 30 mol % to about 50 mol %.

* * * * *